United States Patent
Chavan et al.

(10) Patent No.: US 7,743,197 B2
(45) Date of Patent: Jun. 22, 2010

(54) SYSTEM AND METHOD FOR VIRTUALIZING PCIE DEVICES

(75) Inventors: Mukund T. Chavan, Costa Mesa, CA (US); Sriram Rupanagunta, Bangalore (IN)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 957 days.

(21) Appl. No.: 11/433,728

(22) Filed: May 11, 2006

(65) Prior Publication Data

US 2007/0266179 A1 Nov. 15, 2007

(51) Int. Cl.
G06F 13/36 (2006.01)
(52) U.S. Cl. .................................... 710/314; 709/250
(58) Field of Classification Search ......... 710/306–317; 709/220–239
See application file for complete search history.

(56) References Cited

U.S. PATENT DOCUMENTS

| | | | | |
|---|---|---|---|---|
| 7,287,114 B2 * | 10/2007 | Sullivan | ....................... | 710/316 |
| 7,356,636 B2 * | 4/2008 | Torudbakken et al. | ....... | 710/313 |
| 7,484,029 B2 * | 1/2009 | Boyd et al. | ................. | 710/310 |
| 7,502,884 B1 * | 3/2009 | Shah et al. | ................... | 710/316 |
| 7,529,860 B2 * | 5/2009 | Freimuth et al. | ............... | 710/8 |
| 7,613,864 B2 * | 11/2009 | Torudbakken et al. | ....... | 710/312 |
| 2006/0195618 A1 * | 8/2006 | Arndt et al. | .................... | 710/1 |
| 2006/0253619 A1 * | 11/2006 | Torudbakken et al. | ......... | 710/31 |
| 2008/0256284 A1 * | 10/2008 | Evoy et al. | .................. | 710/316 |

OTHER PUBLICATIONS

"AN2004 Athens Storage Processor—Single Chip ISCSI, NAS," Product Brief; Astute Networks, San Diego, CA; 2006, MKT-044 Rev. 2.1 (2 pages).
"Pericles, The Intelligent Protocol Processor", Product Brief; Astute Networks, San Diego, CA; 2003, MKT-005 Rev. 3.3 (2 pages).

* cited by examiner

Primary Examiner—Raymond N Phan
(74) Attorney, Agent, or Firm—Morrison & Foerster LLP

(57) ABSTRACT

An intelligent network processor is disclosed that provides a PCI express (PCIe) host bus adapter with firmware selectable hardware capabilities and firmware enabled emulation of capabilities not supported by hardware. Support for Fibre Channel (FC) and Gigabit Ethernet (GbE) protocols are provided through the same fabric ports, including multiple port trunking for both protocols. On chip protocol conversion is provided for switching and routing between FC and GbE ports. Switching using the same crossbar module is provided for both FC and GbE protocols. The crossbar module is coupled to directly access external DDR memory so that messages from FC, GbE, and PCIe interfaces may be switched directly to the DDR memory.

75 Claims, 11 Drawing Sheets

SYSTEM AND METHOD FOR VIRTUALIZING PCIE DEVICES

CROSS-REFERENCE TO RELATED APPLICATIONS

This application is related to U.S. application Ser. No. 10/569,322 filed on Feb. 14, 2006, the contents of which are incorporated herein by reference.

FIELD OF THE INVENTION

This invention relates to Intelligent Network Processors (INPs) for use in computer network systems, and more particularly to such INPs for providing Host Bus Adapter (HBA), router, and switch capabilities on Fibre Channel (FC) and Gigabit Ethernet (GbE) protocol networks connected to a host through a Peripheral Component Interconnect express (PCIe) host interface.

BACKGROUND OF THE INVENTION

INPs are used in computer network systems for providing HBA, router, and switch capabilities for particular protocol networks connected to a host through a host interface. An example of an INP 110 is shown in FIG. 1, which may be formed on a single silicon integrated circuit die packaged inside a ceramic, metal, or plastic housing to form a unitary component. INP 110 includes a shared memory crossbar module 112 which is controlled by a flow identification/scheduler module 114 through a bus 128. The flow identification/scheduler module 114 operates under the control of the Application Processor (APEX) module 116 acting through the bus 130, and maps the passages of crossbar locations inside the shared memory crossbar module 112. The APEX 116 in the example of FIG. 1 contains ten core processors for executing firmware, denoted as processors 118-127.

The shared memory crossbar module 112 is connected to Protocol Coordination Stage (PCS) modules 132 and 134 through buses 136 and 138, respectively. PCS module 132 is connected to and controls the operation of Media Access Controller (MAC) modules 140, 142, 144, and 146. The MAC modules 140, 142, 144, and 146 are identical hardware interfaces capable of each communicating using the FC protocol at 1 Gigabits per second (Gbps) or 2 Gbps speeds. The speed and protocol settings for the for the MAC modules 140, 142, 144, and 146 are controlled by the PCS 132, which operates in response to control signals from a bus (not shown) connecting the PCS 132 to the APEX 116. A parallel 10 Gbit (X Gbit) Medium-Independent Interface (XGMII) port 147 may be provided from the PCS 132, as determined by control signals originating from the APEX 116. The 10 Gb XGMII interface is not coupled to any of the four MAC modules.

In the example of FIG. 1, PCS 134 is connected to MAC modules 148, 150, 152, and 154 in the same way that PCS 132 is connected to MAC modules 140, 142, 144, and 146. The construction of PCS 134 is the same as the construction of PCS 132, but PCS 134 operates independently of the PCS 132. MAC modules 148, 150, 152, and 154 have the same construction as the MAC modules 140, 142, 144, and 146.

A System Packet Interface level 4, phase 2 (SPI4.2) interface module 156 is connected to the shared memory crossbar module 112 through bus 158. The SPI4.2 interface module 156 may be connected to high-speed I/O through external bridges, or to a backplane through a switch-chip fabric, or to other network processors (not shown). Another SPI4.2 interface module 160 is connected to the shared memory crossbar module 112 through bus 162. The SPI4.2 interface module 160 may also be connected to high-speed Input/Output (I/O) through external bridges, or to a backplane through a switch-chip fabric, or to other network processors (not shown).

Each of the MACs 140, 142, 144 and 146 may be coupled to a separate, off-chip SERializer/DESerializer modules (SERDES). The function of the off-chip SERDES is to provide electronic signals in the FC protocol to off-chip transceivers (not shown), which may be optical transceivers for connection to fiber optic cables or electrical transceivers for connection to electrical cables. The MACs 148, 150, 152 and 154 may also be coupled to separate, off-chip SERDES (not shown).

A Double Data Rate (DDR) Synchronous Dynamic Random Access Memory (SDRAM) controller 164 is connected to the scheduler 114 through bus 166. The function of the controller 164 is to control the sending and receiving of data to and from an external DDR memory module (not shown) connected to an external bus 168 of the controller.

A support processor 115 handles certain processing tasks not otherwise covered by the APEX 116, and has an external connection 117. A Joint Test Action Group (JTAG) module 168 has an external connection 170, and is used for boundary scan testing of the hardware contained within INP 110. Serial flash memory 172 has an external connection 174, and is a non-volatile reprogrammable memory which may be loaded through the connection to store firmware for operation of APEX 116 and support processor 115.

FIG. 2 is an illustration of firmware and software structures 210 for use with the INP of FIG. 1 (shown as an INP hardware block in FIG. 2). The structures 210 serve to provide the computer codes for activating the INP hardware block, and for interacting with a host Operating System (OS) software structure (not shown) such as Linux or Microsoft Windows. On-chip firmware 214 may be downloaded into the INP, and are for execution by the APEX module and support processor of FIG. 1. The firmware 214 interacts with the hardware through connection 218.

A Platform Integration Module (PIM) 222 is firmware code for execution by the support processor of FIG. 1, and includes a boot startup and Power On Self Test (POST) module 224, online and offline diagnostic program module 226, configuration and device management module 228, and status and debug log module 230. The PIM 222 may be accessed through the connection 232. The connection 232 is preferably the same as the connection 117 of FIG. 1. This module can be customized for each platform that the INP is integrated with.

The on-chip firmware 214 and PIM 222 may be accessed by an external software operating system through a hardware abstraction layer 234, or may be directly accessed through a connection 236. The layer 234 is a part of a software driver program which also includes an infrastructure services module 238 and a virtualization and basic copy services module 240. The software driver including the layer 234 and modules 238 and 240 is to be executed as a program on an external host computer processor (not shown) under the control of a host operating system software structure (not shown).

The infrastructure services module 238 includes a discovery and initiator driver 248, a statistics driver 250, a FC initiator and target driver 252, and a device management driver 254. The virtualization and basic copy services module 240 includes a virtualization services driver 258 and a basic copy services driver 260.

The PCIe specification entitled "PCI Express™ Base Specification Revision 1.1 Mar. 28, 2005," incorporated by reference herein, available from the web site www.pcisig.org, defines the terms "configuration," "device," "EndPoint" (EP), "function", "lane," "link," and "Root Complex" (RC) as used in connection with PCIe bus designs. Each PCIe device connected to the PCIe bus is given a configuration. A problem with the PCIe standard is that it does not describe a way for a HBA to present multiple PCIe device configurations simultaneously, and to change the PCIe device configurations. In addition, the PCIe standard does not describe a way for a HBA to present emulated PCIe device configurations through the PCIe bus to a host computer using memory apertures in the host memory.

Another industry specification, the Advanced Switching Interconnect Sig (ASI SIG™) specification entitled "Advanced Switching Core Architecture Specification Revision 1.1—Final, November 2004", incorporated herein by reference, is available from the web site www.asi-sig.org, is based on the PCIe architecture, and adds transaction layer capabilities to enable flexible protocol encapsulation, peer-to-peer transfers, dynamic reconfigurations, and multicast. The ASI SIG™ specification describes the use of "apertures" for device configuration. The basic purpose of ASI SIG™ is to create a switching fabric using PCIe links. However, the ASI SIG™ specification does not provide a way for configurations to be changed in an aperture by a HBA, or for device configurations to be emulated in firmware by a HBA.

SUMMARY OF THE INVENTION

The present invention is directed to INPs for providing HBA, router, and switch capabilities on FC and GbE protocol networks connected to a single host or multiple hosts (as in the case of multi-root) through a PCIe host interface. The INP includes a Bi-directional Crossbar Module (BCM) which is controlled by a flow identification and scheduler module. The scheduler operates under the control of the APEX, and maps the passages of crossbar locations inside the BCM. The APEX contains multiple core processors for executing firmware. The BCM is connected to PCS modules, which are connected to and control the operation of Combined Media Access Controller (CMAC) modules capable of each communicating using multiple protocols. The speed and protocol settings for the CMAC modules are controlled by the PCS. The PCS also has trunking modes in which it coordinates the operation of the CMAC modules together as a single trunk. A combined SERDES is coupled to each of the CMACs and selectively provides, under control of signals coupled from the APEX, electronic signals in one of multiple protocols (e.g. the FC and GbE protocols), or trunking protocols.

A Root Complex and EndPoint (RC/EP) module is connected to the BCM, and is connected to a SERDES for use with PCIe bus signals. A Direct Memory Access (DMA) engine and stream processor is connected to the BCM, and is also connected to a DDR SDRAM controller. The function of the controller is to control the sending and receiving of data to and from an external DDR memory module. A data pathway from the DMA engine and stream processor to the BCM allows DMA memory operations to occur directly with the controller and its attached DDR memory module, without data flow through the APEX, for data being exchanged with other sources. The controller is also connected to the scheduler, and creates queues in the external DDR memory for storing data messages, and also writes to and reads from such queues.

In a so-called "single root" system configuration comprised of a single root complex (e.g. a host) and an INP representing one of perhaps several endpoints, the host may be logically partitioned into multiple virtual servers, each running a separate "guest" OS. The logical partitioning of the host may be managed by hypervisor software. When each guest OS is initialized, it independently initiates a configuration cycle, allocates itself a certain range of PCI space for each of its Base Address Registers (BARs), and configures other configuration registers in its configuration header. The hypervisor also creates its own configuration space within the INP by performing a configuration cycle in which the host first discovers what PCIe devices exist on the PCI bus, including the INP.

The INP may be configured using firmware to emulate multiple virtual PCIe devices. Instead of providing hardware configuration registers for each virtual PCIe device capable of being emulated, the INP presents only a single set of eight hardware Configuration Space Registers (CSRs) (including BARs) to a host within its PCIe core, and responds to and terminates the configuration cycle in a manner similar to conventional PCI devices.

To facilitate communications with the virtual PCIe devices that may be instantiated by the INP, an aperture table containing one entry for every BAR in the configuration space of every guest OS may be employed. Each aperture table entry includes an address field, which includes a base address and a length field that together represent an address range for that entry, and a destination field which contains the address of a processor that will be emulating the virtual PCIe device associated with that entry.

When the INP is first initialized, its firmware first establishes its own configuration space, and sets up a default entry in the aperture table. The default entry will redirect all read/write requests to a support processor within the INP during the configuration of the virtual PCIe devices. After the configuration space in the INP is established, a device driver in the hypervisor within the host then configures one of the sets of configuration registers in the PCIe core, including the BARs. The device driver communicates with the INP by sending proprietary Control Path Messaging Layer (CPML) messages to the INP, seeking to determine how many virtual PCIe devices the INP supports. The CPML message contains an address that corresponds to the default entry in the aperture table, so that when the CPML message is received into the INP, it is applied to the aperture table and matched up with the address of the default entry, which then redirects all such CPML requests to the support processor. After the support processor receives the redirected request for the number of supported virtual PCIe devices, the support processor sends a response back to the device driver with an answer.

The device driver will then send CPML messages to the support processor through the default aperture table entry to create the appropriate number and type of virtual PCIe devices within the INP. The support processor also configures the aperture table and creates an aperture entry for each BAR in each newly created virtual PCIe device. The device driver then sends further CPML messages (memory write messages) through the default aperture table entry to the support processor, which configures the corresponding newly created aperture entries so that these addresses point to a processor that will be responsible for emulating the virtual PCIe device.

After the configuration phase is complete, subsequent data transfers occur directly between the drivers in the guest OSs and the INP through read and write commands. Read or write requests from a guest OS are routed to the aperture table, and the addresses of the requests are applied to the aperture table and compared with entries representing the BARs for that guest OS to determine if there is an entry having an address range (i.e. a "bin") encompassing the address of the request. If a match is found, the entry in the aperture table then redirects the request to perform the action associated with any enabled rules for that entry. For example, the entry may direct the request to one of the processors in APEX via the crossbar. A free processor in APEX then executes the firmware necessary to emulate the functionality of the virtual PCIe device associated with that particular entry and respond to the host as though it were a physical PCIe device.

In a so-called "multi-root" system, multiple blades, each with a device driver and optionally a hypervisor (with multiple Guest OSs), are connected to an INP through a PCIe switch subsystem. The PCIe switch subsystem includes one non-transparent bridge for each blade, and a standard PCIe switch device. Each of the blades has a PCIe connection to a virtual side of a non-transparent bridge, and the standard PCI switch device is connected to a physical side of each non-transparent bridge. The INP is connected to the standard PCI switch device. In the multi-root system, both the blades and the INP are considered to be root complexes. However, as far as each blade is concerned, each connection to its corresponding non-transparent bridge is like an endpoint, because each blade thinks it is attached to a single PCIe device.

When each blade is powered up and runs through its configuration cycle and discovery process, it independently discovers one device in the form of its corresponding non-transparent bridge, and configures the non-transparent bridge by setting up its configuration space, including the BARs and other configuration registers. The non-transparent bridge then terminates the configuration cycle. Because there is no central entity in the multi-root system to configure the virtual PCIe devices in the INP (similar to hypervisor in single root systems), the INP must perform this configuration task. The INP therefore performs register reads to read the configuration registers of each non-transparent bridge and determine what each of the blades has configured as its BARs. After reading the BARs for the blades, it creates an entry in the aperture table for each BAR. Note also that each non-transparent bridge can translate addresses from one domain to another. The translation from the configuration space known to each blade to the configuration space for the virtual PCIe device associated with that blade occurs in the non-transparent bridges. The INP firmware actually goes out over the PCIe bus and programs each bridge to perform the address translation properly.

After the system is configured, each blade can talk to its own virtual PCIe device through the one or more aperture entries corresponding to the BARs for the blade, and each blade can operate independently (e.g. perform reads/writes independent of the other blades). The way that the INP maintains the requestor information, and how the APEX responds to the requests, is described below.

An INP may also utilize programmable configuration logic that may replace the aperture table described above, or may work together with the aperture table. In this embodiment, the headers of PCIe transactions are evaluated by the configuration logic to determine the classification of the PCIe transaction (i.e. the type of cycle). Depending on the classification, the configuration logic may take certain actions. For example, if the configuration logic determines that a discovery or configuration request (i.e. a configuration cycle) is being presented, the discovery or configuration request is passed through the crossbar to the APEX. A free processor in the APEX then executes firmware to respond to and terminate the configuration cycle by providing information and indications back to the host indicating that virtual PCIe devices have been discovered and configured. The particular processor and firmware performs translations from the configuration space of the requestor to the virtual configuration space of the virtual PCIe device being emulated.

The common processing elements of FC and GbE MACs may be integrated into an efficient CMAC. Both protocols require SERDES, Cyclic Redundancy Checking (CRC) and First-In-First-Out (FIFO) buffers for rate matching, and thus the logic for these tasks is shared in the CMAC. However, because the logic (state machine) to perform 8b10b decoding, to detect Start of Frame Delimiters (SFDs) and End of Frame Delimiters (EFDs) for each protocol, and to packetize FC frames is different for the two protocols, this logic is duplicated and switched in or out as needed. To produce a FC/GbE CMAC, multiple bytes must be framed as packets. After the SFDs have been detected, logic specific to each protocol may be employed outside the CMAC and switched in or out depending on the protocol to parse the bytes in the packet. The CMACs are configurable by a processor to decode the incoming packets or frames as either FC "packets" or GbE packets.

The INP may also employ a hashing scheme for CMAC filtering. In the hashing scheme, the hashing rules are made scalable without adding hardware, so each CMAC can have many more rules than their hardware registers would allow. The scheduler includes a hash engine, for which sophisticated hashing rules can be set. For example, if a CMAC wants to accept any packet having one of 2 k destination MAC addresses, the hash engine can be configured such that for every one of the 2 k destination MAC addresses, a hash entry is created in off-chip DDR SDRAM.

After the hash entries are created, if a packet is subsequently received on a CMAC containing one of the 2 k destination MAC addresses, it enters the BCM and is routed to the scheduler, which performs a hash of the destination MAC address in the packet, and attempts to match it with one of the hash entries in DDR. If a match is found, the packet is then forwarded to one of the APEX processors. On the other hand, if a packet is received that does not have one of the 2 k destination MAC addresses, a bit in the packet header is set indicating a "hash miss." The packet is thereafter still forwarded to the APEX block, but the APEX firmware will detect the hash miss bit and know that the packet was not to be received, so the packet is discarded. The CMAC filtering can be made protocol independent by making the offset at which the address of a received packet is located programmable to accommodate the addressing of any protocol.

The INP is also capable of performing switching operations combined with protocol conversion without having the data leave the crossbar. The headers of the packet may be modified, but the data is left alone, repacked into a different frame, and shipped out a destination port.

Conventional BCMs utilize the concept of credits for their ports. Credits are essentially the number of free buffers at a particular port for storing frames or packets. One credit is consumed when a packet is received, and one credit is released when a packet is sent it out of the crossbar to another port (or to the APEX block). Normally the credits for each of the ports are part of the crossbar, in limited on-chip memory. The INP may also employ crossbar credit extensions wherein multiple ports may be given an extended number of credits using off-chip memory. To accomplish this, the external DDR memory is treated as another port on the crossbar. When crossbar logic in the BCM determines that more credits are needed for a particular port, the crossbar logic will make a request to the DMA block, which has access to the off-chip DDR memory through the DDR controller, to effectively gain access to additional credits stored in the DDR memory.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
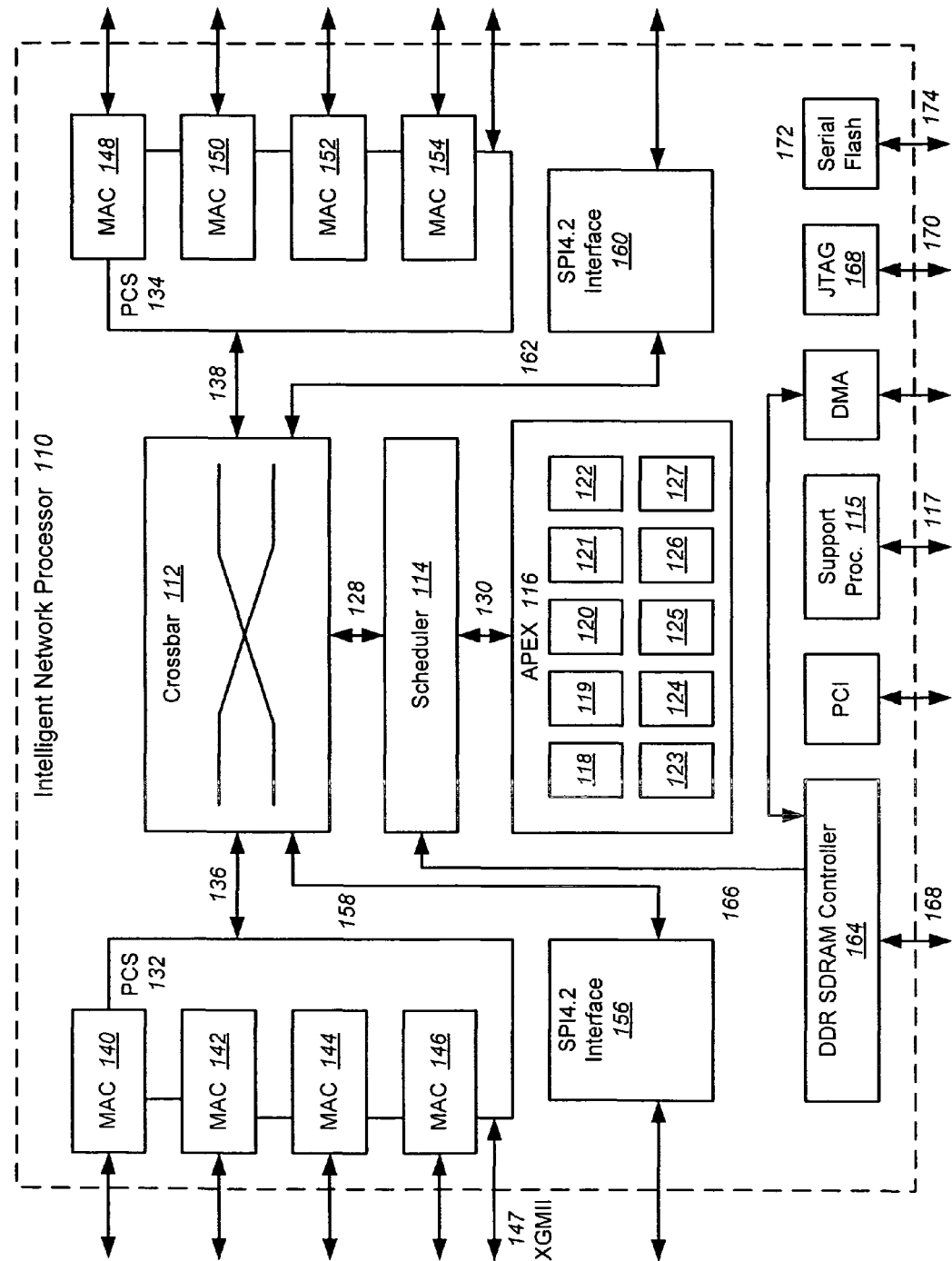
FIG. 1 is an illustration of an intelligent network processor hardware block diagram.
Figure 2:
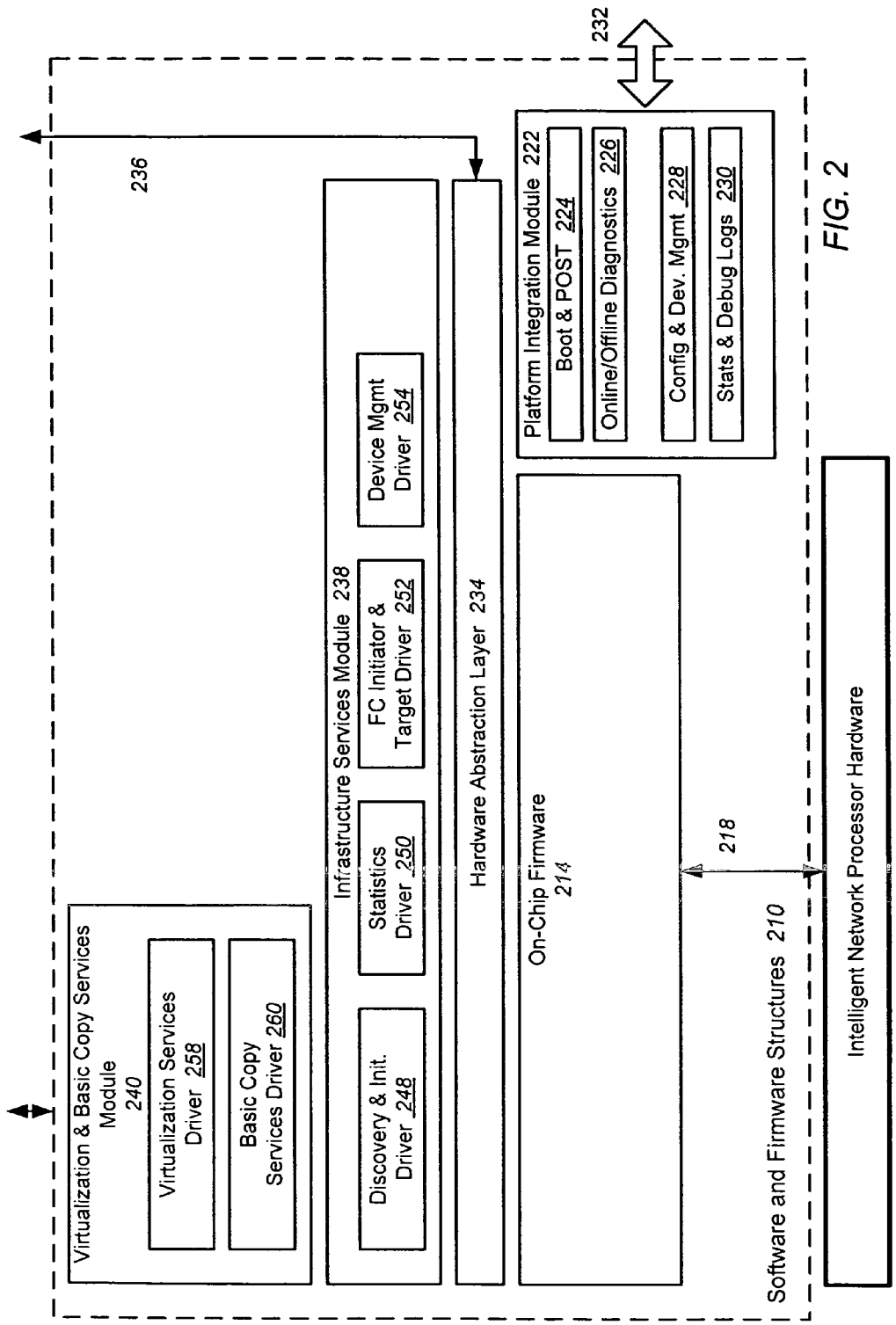
FIG. 2 is an illustration of an intelligent network processor firmware and software block diagram.
Figure 3:
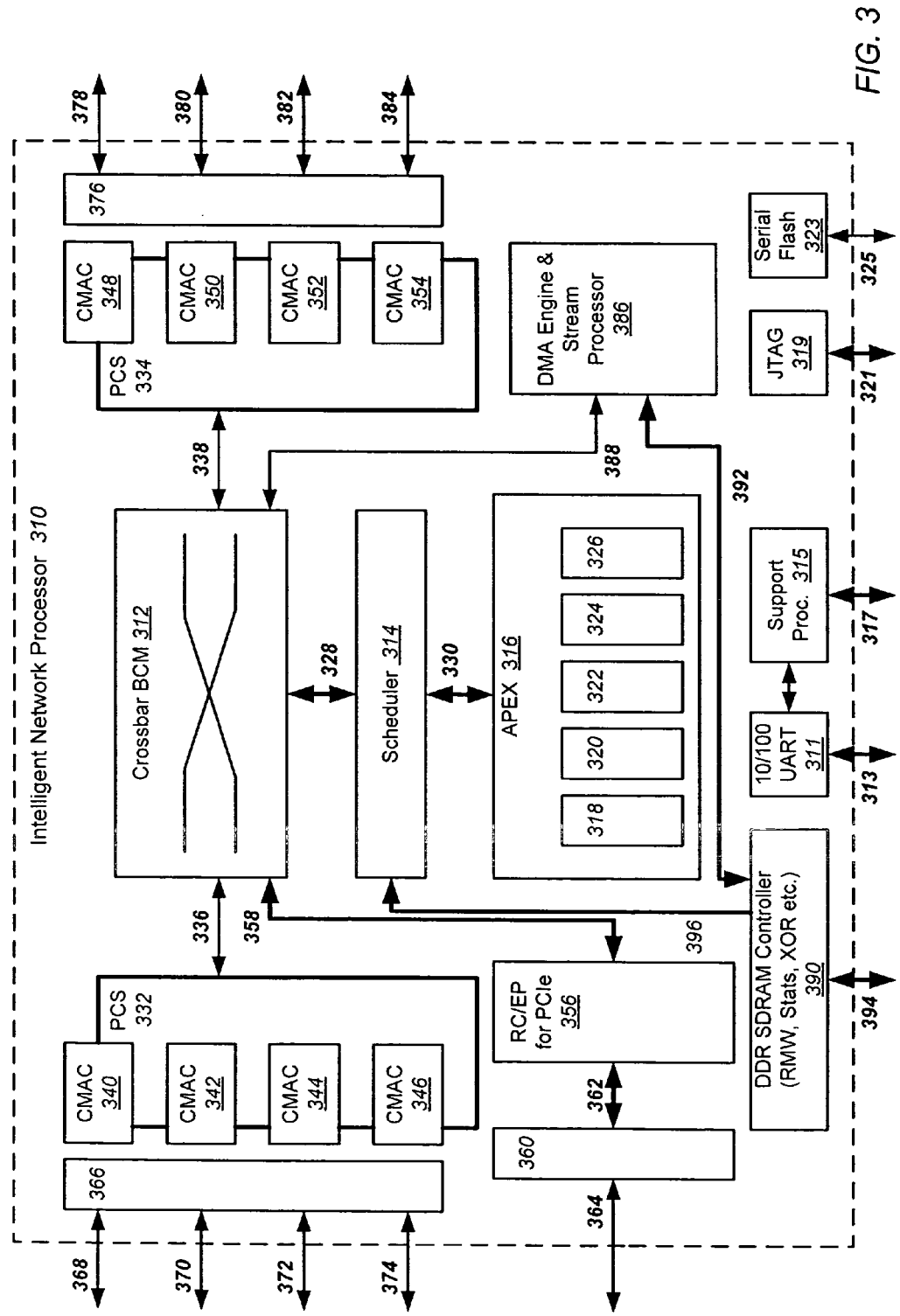
FIG. 3 is an illustration of an exemplary intelligent network processor hardware block diagram according to embodiments of the present invention.

FIG. 3 is an illustration of an INP 310 implemented according to embodiments of the present invention. INP 310 may be composed of a single silicon integrated circuit die, which may be packaged inside a ceramic, metal, or plastic housing to form a unitary component. NP 310 includes a BCM 312 which is controlled by a flow identification and scheduler module 314 through a bus 328. The BCM 312 may be a multi-ported shared Random Access Memory (RAM) having memory locations mapped as passages, and operating at 224 Gbps. The scheduler 314 operates under the control of the APEX 316 acting through the bus 330, and maps the passages of crossbar locations inside the BCM 312. The scheduler 314 pre-processes received frames, packets, and PCIe requests before they are acted upon by APEX 316. The scheduler 314 also parses received FC frames into correct sequence, and parses received GbE packets (in Internet Protocol (IP) format) into a Transport Control Protocol (TCP) flow.

The APEX 316 preferably contains five core processors for executing firmware, denoted as processors 318, 320, 322, 324, and 326. The processors 318, 322, 324, and 326 may be core model ARC750 as provided by ARC, Inc., which preferably each have the capability of executing 32 bit Reduced Instruction Set Computer (RISC) firmware with a clock speed of 500 MHz, and may each include 32 KB of dedicated instruction memory (not shown).

The BCM 312 is connected to PCS modules 332 and 334 through buses 336 and 338, respectively. PCS module 332 is connected to and controls the operation of Combined Media Access Controller (CMAC) modules 340, 342, 344, and 346. The CMAC modules 340, 342, 344, and 346 are identical hardware interfaces capable of each communicating using the FC protocol at 1 Gbps, 2 Gbps, and 4 Gbps speeds; and are each capable of communicating using the Ethernet protocol (the Internet Protocol) at 1 Gbps speed (1 GbE). The speed and protocol settings for the CMAC modules 340, 342, 344, and 346 are controlled by the PCS 332, which operates in response to control signals from a bus (not shown) connecting the PCS 332 to the APEX 316. The PCS 332 also has trunking modes in which it coordinates the operation of the four CMAC modules 340, 342, 344, and 346 together as a single trunk, when such trunking modes are determined by control signals from the APEX 316. One of the trunking modes of the PCS 332 causes the CMAC modules 340, 342, 344, and 346 to operate together as a single trunk for 10 Gbps FC protocol (10 Gb FC) provided in an X Attachment Unit Interface (XAUI) trunk as specified by existing FC standards for signaling. Another of the trunking modes of the PCS 332 causes the CMAC modules 340, 342, 344, and 346 to operate together as a single trunk for 10 Gbps Ethernet protocol (10 GbE) as specified in proposed GbE standards for signaling.

The PCS 334 is connected to the CMAC modules 348, 350, 352, and 354 in the same way that PCS 332 is connected to the CMAC modules 340, 342, 344, and 346. The construction of the PCS 334 is preferably the same as the construction of the PCS 332, but operating independently of the PCS 332. The CMAC modules 348, 350, 352, and 354 preferably have the same construction as the CMAC modules 340, 342, 344, and 346.

The Root Complex and EndPoint (RC/EP) module 356 is connected to the BCM 312 through bus 358, and is connected to bus interface 360 through bus 362. The bus interface 360 is preferably a SERDES for use with PCIe bus signals. The bus interface 360 is connected to the PCIe bus 364 provided by a host computer (not shown). One function of the RC/EP module 356 is to send and receive messages in the format determined by the PCIe industry standard, including configuration inquiry responses, separating messages for lanes, and messages for implementing particular functions. The PCIe bus 364 may have 8 lanes, operating at 2.5 Gbps.

Physical interface 366 includes combined SERDES coupled to each of the CMACs 340, 342, 344, and 346. The function of the interface 366 is to selectively provide, under control of signals coupled from the APEX 316, electronic signals in the FC protocol, GbE protocol, or trunking protocols such as XAUI for 10 Gb FC or 10 GbE. The interface provides such electronic signals on port interface connections 368, 370, 372, and 374 which exit the INP 310. The outputs are coupled to transceivers (not shown) which may be optical transceivers for connection to fiber optic cables, or electrical transceivers for connection to electrical cables. The physical interface 376 is preferably identical in construction to the interface 366, is coupled to the CMACs 348, 350, 352, and 354, and has port interface connections 378, 380, 382, and 384.

The DMA engine and stream processor 386 is connected to the BCM 312 through bus 388, and is connected to the DDR SDRAM controller 390 through bus 392. The function of the controller 390 is to control the sending and receiving of data to and from an external DDR memory module (not shown) connected to the bus 394 of the controller 390. The controller 390 includes capabilities for providing RMW, statistics collection, XOR masking for data being transferred to or from the external DDR memory module. The data pathway through the bus 392 to the DMA engine and stream processor 386 and through the bus 388 to the BCM 312 allows DMA memory operations to occur directly with the controller 390 and its attached DDR memory module, without data flow through the APEX 316, for data being exchanged with other sources including the PCIe capabilities accessed through the bus 358 and RC/EP module 356, and the FC and GbE capabilities accessed through the buses 336 and 338 with the PCS modules 332 and 334. The ability to allow direct access for DMA operations through the BCM 312 with the DDR SDRAM controller 390 saves time that would be otherwise consumed by data being transferred into and out of the APEX 316. The controller 390 is also connected to the scheduler 314 through the bus 396. The controller 390 creates queues in the external DDR memory for storing data messages, and writes to and reads from such queues. The use of such queues, and the direct memory access to the crossbar BCM 312 (through the buses 388 and 392, controller 390, and DMA engine and stream processor 386) effectively increases the size of the crossbar BCM 312, and allows more switching pathways to be created than if the BCM 312 were used without the external DDR memory attached to connection 394.

The DMA engine and stream processor 386 may also perform several data stream transformations, including but not limited to T10.CAP (the Data Integrity protocol standard), data Cyclic Redundancy Check (CRC)/checksum insertion or checking/removal, marker insertion or removal, and transferring data to/from multiple buffers.

A Universal Asynchronous Receiver/Transmitter (UART) module 311 is provided which allows external control communications with the INP 310 at rates including 10 Megabits per second (Mbps) and 100 Mbps, though a UART connection 313. A support processor 315 is connected to exchange messages with the UART module 311, and has an external connection 317. The support processor 315 is preferably a core model ARC750 as provided by ARC, Inc. JTAG module 319 has an external connection 321, and is used for boundary scan testing of the hardware contained within the INP 310. The serial flash memory 323 has an external connection 325, is preferably a non-volatile reprogrammable memory which may be loaded through the connection 325, and stores the firmware for operation of the APEX 316 and support processor 315.

Figure 4:
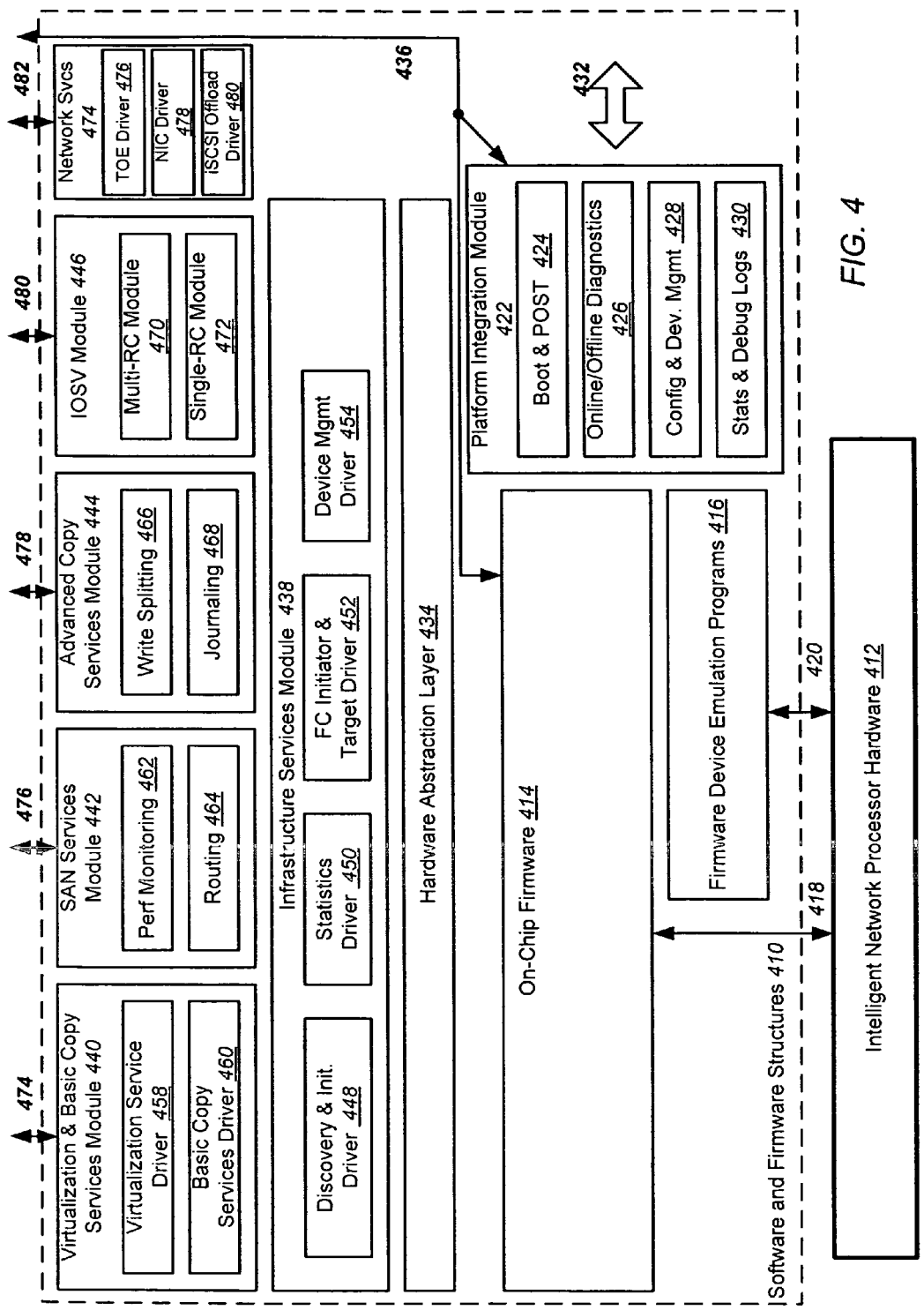
FIG. 4 is an illustration of an exemplary intelligent network processor firmware and software block diagram according to embodiments of the present invention.

FIG. 4 is an illustration of the firmware and software structures 410 for use with the INP of FIG. 3, as implemented according to embodiments of the present invention. The structures 410 serve to provide the computer codes for activating the INP hardware 412, and for interacting with a host operating system software structure (not shown) such as Linux or Microsoft Windows. The hardware 412 is preferably the same as the INP of FIG. 3. On-chip firmware 414 and firmware device emulation programs 416 may be downloaded into the hardware 412, and are for execution by the APEX and support processor of FIG. 3. The firmware 414 and programs 416 interact with the hardware 412 through connections 418 and 420, respectively.

PIM 422 is firmware code for execution by the support processor of FIG. 3, and includes a boot startup and POST module 424, online and offline diagnostic program module 426, configuration and device management module 428, and status and debug log module 430. The PIM 422 may be accessed through the connection 432. The connection 432 is preferably the same as the connection 317 of FIG. 3.

The on-chip firmware 414 and PIM 422 may be accessed by an external software operating system through a hardware abstraction layer 434, or may be directly accessed through a connection 436. The layer 434 is a part of a software driver program which also includes an infrastructure services module 438, a virtualization and basic copy services module 440, a Storage Area Network (SAN) services module 442, an advanced copy services module 444, an Input/Output Storage Virtualization (IOSV) module 446, and a network services module 474. The software drivers including the layer 434 and modules 438, 440, 442, 444, 446 and 474 are to be executed as a program on an external host computer processor (not shown) under the control of a host operating system software structure (not shown).

The infrastructure services module 438 includes a discovery and initiator driver 448, a statistics driver 450, a FC initiator and target driver 452, and a device management driver 454. The virtualization and basic copy services module 440 includes a virtualization services driver 458 and a basic copy services driver 460. The SAN services module 442 includes a performance monitoring module 462 and a routing module 464. The advanced copy services module 444 includes a wire splitting module 466 and a journaling module 468. The IOSV module 446 includes a multi-RC module 470 and a single RC module 472. The network services module 474 includes a Transmission Control Protocol (TCP) Offload Engine (TOE) driver 476, a Network Interface Card (NIC) driver 478, and an internet Small Computer System Interface (iSCSI) offload driver 480. The modules 440, 442, 444, 446 and 474 interface with the host operating system software structure (not shown) through the connections 474, 476, 478, 480 and 482, respectively.

Figure 5:
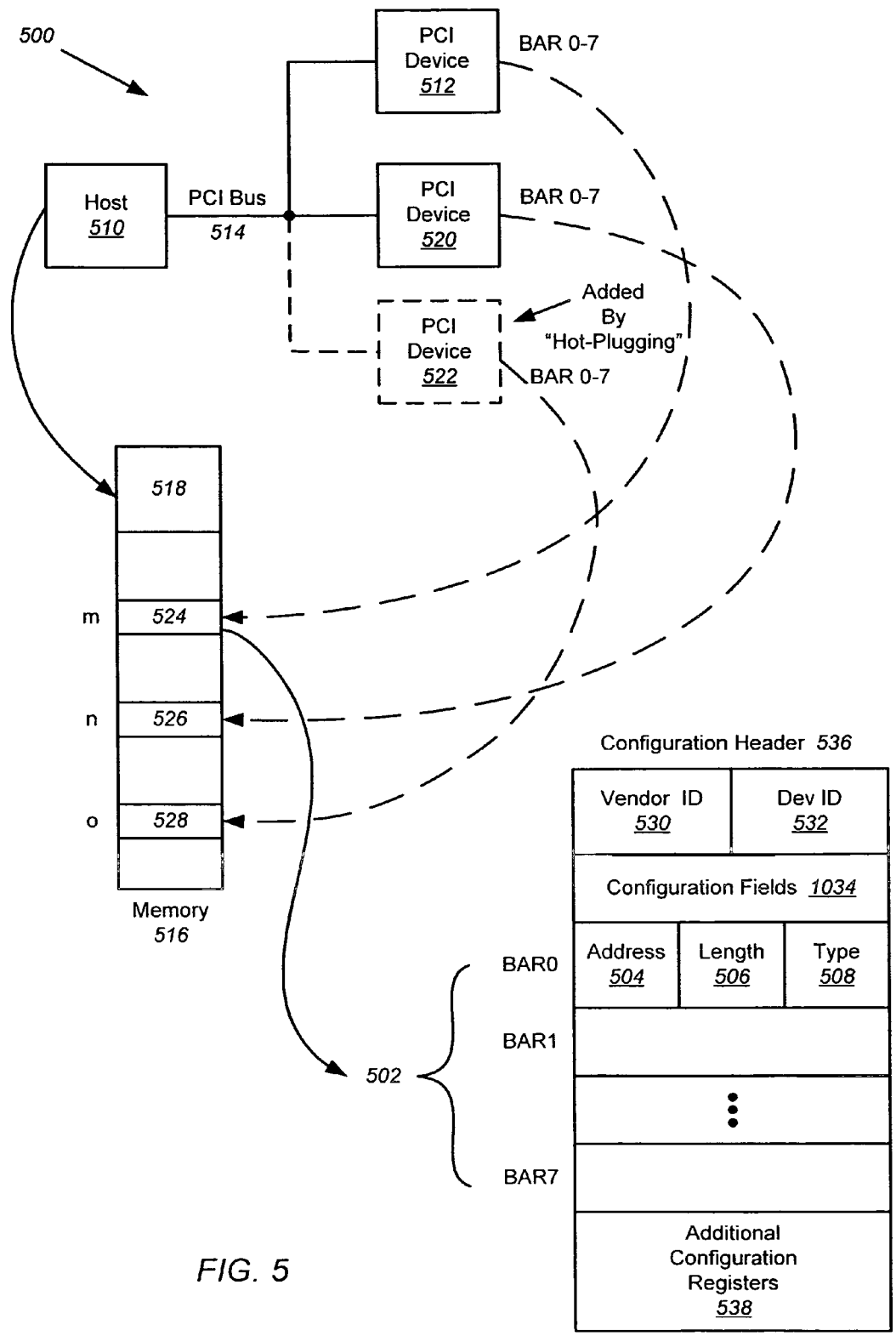
FIG. 5 is an illustration of a conventional Peripheral Component Interconnect system.

As shown in the example of FIG. 5, in a conventional PCI system 500, a host 510 may be connected to multiple PCI devices (although only two PCIe devices 512 and 520 are shown) through a PCI bus 514. The PCI standard specifies that configuration space shall be allocated for each PCI device in the form of configuration registers that consume hardware resources. In particular, each PCI device is assigned one or more mutually-exclusive blocks of memory in the host's memory-mapped memory space 516. In the example of FIG. 5, host 510 has been assigned memory space 518, PCI device 512 has been assigned memory space 524 (designated by the letter "m"), and PCI device 520 has been assigned memory space 526 (designated by the letter "n").

According to the PCI standard, as part of the configuration space allocated to each PCI device, each PCI device may be allocated up to eight BARs 502 in a configuration header 536, referred to as BAR0-BAR7 in FIG. 5. Each BAR contains the start address 504 of a block of memory space in memory 516 assigned to a function of the PCI device, and the length 506 and type of memory space 508 (memory or I/O) required by the function. The start address 504 of the BAR enables a memory or I/O address decoder in the PCI device to detect device accesses whose addresses fall within the block of memory space specified by the BAR. Additionally, other configuration registers 538 (including doorbells and status registers) may be allocated for each PCI device and assigned memory space such that once mapped, a host and the PCI device can communicate using that memory space.

During configuration of the PCI system, the host 510 performs a configuration cycle where the host first discovers what PCI devices exist on the PCI bus 514, and then configures the configuration registers for those PCI devices. To implement the discovery process, a host's configuration software sends a discovery request out over the PCI bus 514, which reads a subset of each PCI device's configuration registers (e.g. vendor IDentification (ID) register 530 and device ID register 532) in configuration header 536 to determine the presence of the PCI device and its device type. The host 510 also accesses other configuration registers 534 in the PCI device to determine how many blocks of memory the PCI device requires. To configure a particular PCI device, the host sends a configuration request to assign memory space to the PCI device by assigning an address to the BARs of that PCI device. Note that the length field 506 and the type field 508 of each BAR are generally fixed, and only the address field 504 is programmable. When a particular PCI device has been discovered and configured, the PCI device responds back to the host, resulting in the termination of the configuration cycle for that PCI device.

If a new PCI device 522 should be connected to the PCI bus (e.g. in a "hot-plug" event), the new device will provide an indication back to the host 510, indicating that a new configuration cycle should be commenced to enable the new PCI device 522 to be discovered and configured (in addition to the re-discovery and reconfiguration of all existing PCI devices). In the example of FIG. 5, after the new PCI device 522 has been discovered and configured, the PCI device is assigned memory space 528 (designated by the letter "o"), and an indication is sent back to the host, indicating that the configuration cycle for the new PCI device has been terminated.

Figure 6:
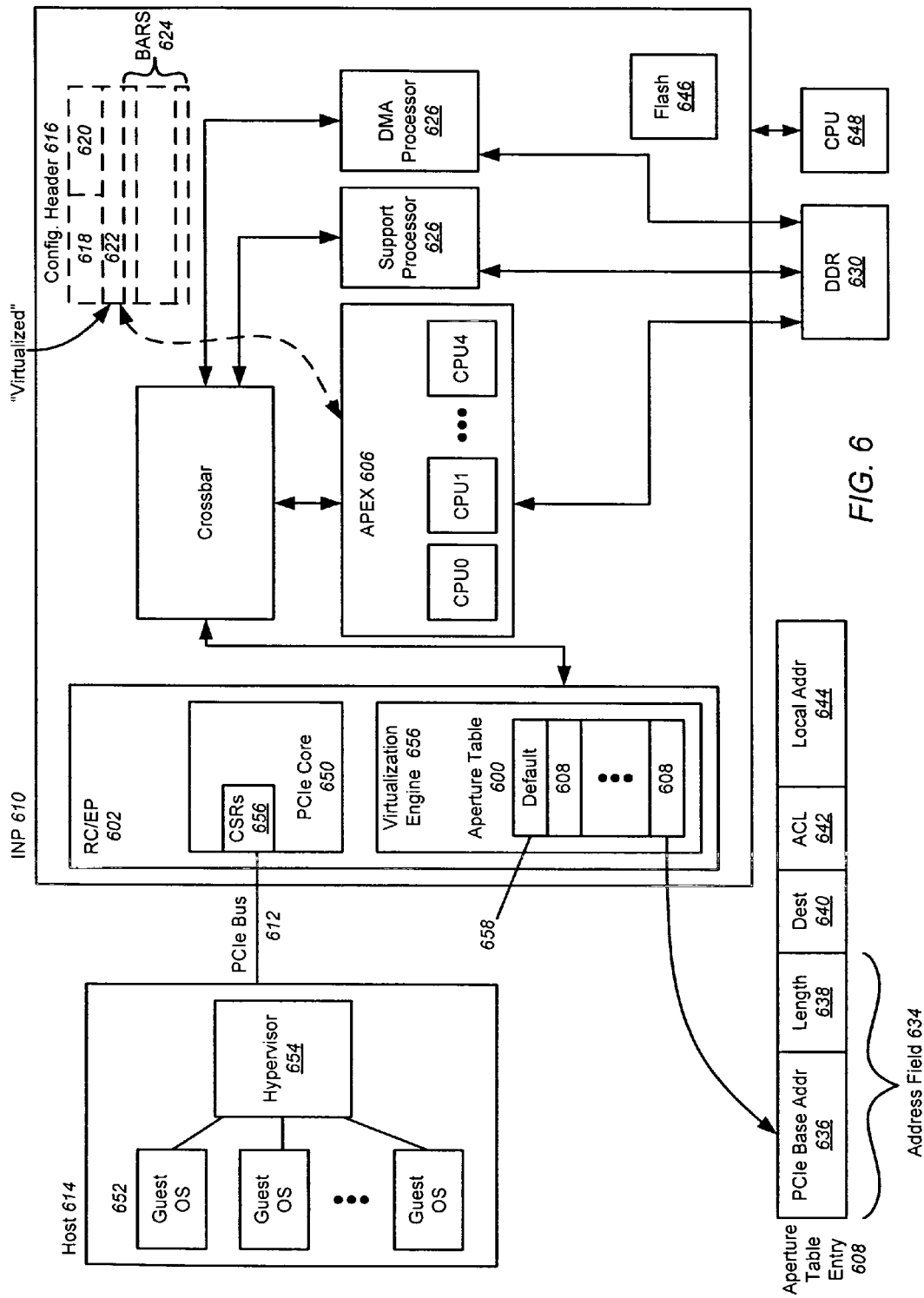
FIG. 6 illustrates an exemplary single-root system according to embodiments of the present invention.

FIG. 6 is an illustration of an exemplary system employing an INP 610 according to embodiments of the present invention. Note that INP 610 is a simplified representation of the INP of FIG. 3, emphasizing the PCIe interface. FIG. 6 illustrates a so-called "single root" system configuration comprised of a single root complex (the host 614) and an INP 610 representing one of perhaps several endpoints. In the example of FIG. 6, the host is logically partitioned into multiple virtual servers, each running a separate "guest" OS 652. The logical partitioning of the host 614 is managed by hypervisor software 654.

When each guest OS 652 is initialized, it independently initiates a configuration cycle, allocates itself a certain range of PCI space (e.g. 3 to 4 Gbyte blocks) for each of its BARs, and configures other configuration registers in its configuration header. Because each guest OS 652 operates independently without knowledge of other guest OSs that might be sharing main memory, the address ranges of the BARs of different guest OSs could actually be overlapping. The configuration cycle of each guest OS 652 is terminated by the hypervisor. However, because the hypervisor 654 manages the configuration space of the guest OSs 652, inside the hypervisor software is the only place that the guest OSs' configuration space really exists. The hypervisor creates its own configuration space within the INP 610 and manages the system such that the host 614 appears as a single root complex to the INP, and the INP appears to each of the guest OSs in the configuration expected by each guest OS.

Just as in a conventional PCI system, during configuration of the system of FIG. 6, a host 614 performs a configuration cycle wherein the host first discovers what PCIe devices exist on the PCI bus 612. To accomplish this, the host's configuration software sends a discovery request out over the PCIe bus 612, which attempts to read a subset of each PCIe device's configuration registers to determine the presence of the PCIe device and its device type.

In the example of FIG. 6, only a single physical device, the INP 610, is connected to the PCIe bus 612. However, the INP 610 may be configured using firmware to emulate multiple virtual PCIe devices. Any of the processors in the INP 610, including the APEX 606 (which contains multiple Central Processing Units CPU0-CPU4), support processor 626 or the DMA processor 628, all of which communicate with external DDR memory 630, may execute firmware to emulate a virtual PCIe device. However, it would generally be an inefficient use of hardware resources, especially on a single chip, to provide hardware configuration registers for every virtual PCIe device capable of being emulated by the INP 610. Therefore, instead of providing hardware configuration registers for each virtual PCIe device capable of being emulated, the INP 610 presents only a single set of eight hardware CSRs (including BARs) 656 within the RC/EP 602 to respond to and terminate the configuration cycle in a manner similar to conventional PCI devices as described above. These hardware configuration registers may be located in a PCIe processing core 650 within the RC/EP 602.

Each guest OS 652 expects to see a single PCIe device (with multiple functions and a single configuration space). Therefore, to facilitate communications with the virtual PCIe devices that may be instantiated by the INP 610, in embodiments of the present invention the RC/EP 602 also includes a virtualization engine 656 which contains logic for virtualizing and configuring the virtual PCIe devices supported by INP 610. The virtualization engine 656 is essentially a hardware window through which an entity such as the host 614 can communicate with one or more of the processors in the INP 610 to send and receive messages related to configuration of the virtual PCIe devices, and to send and receive messages related to normal communications (e.g. read and write requests) with the virtual PCIe devices.

In one embodiment, the virtualization engine includes an aperture or function table (a.k.a. a "classification engine") 600 containing one aperture or function entry 608 for every BAR in the configuration space of every guest OS 652 (or more generally, for every BAR in the configuration space of one or more OSs communicating with the INP 610 over the PCIe bus 612). Each aperture table entry 608 includes an address field 634, which includes a base address 636 and a length field 638 that together represent an address range for that entry. The entry 608 also includes a destination field 640, which contains the address of the processor (e.g. one of the processors in APEX 606, DDR memory 630, service processor 626, or DMA processor 628) that will be emulating the virtual PCIe device (function) associated with that entry, an Access Control List (ACL) field 642 and a local address field 644. The local address field 644 stores the address in the INP's memory space (external DDR memory). The ACL field 642 is a list that allows only certain requestors (guest OSs) to use the particular aperture entry. However, in the present invention all requesters have the same RequesterID, so the ACL field 642 is not utilized. Each entry 608 also includes a fixed set of rules, wherein each rule can be enabled or disabled by the processor associated with that entry as specified in the destination field 640.

When the INP 610 is first initialized, its firmware first establishes the configuration space 656 of PCIe core 650, including the vendor and device type IDs and other configuration registers to be presented to the host 614, where each configuration register is capable of supporting a different function within the INP. The INP firmware also sets up a default entry 658 in the aperture table. The default entry 658 will redirect all read/write requests to the support processor 626 during the configuration of the virtual PCIe devices.

After the configuration space in the INP 610 is established, a device driver in the hypervisor 654 then configures one of the sets of configuration registers in the PCIe core 650, including the BARs. After the device driver in the hypervisor 654 has discovered and configured the INP 610 as a single PCIe device, the device driver communicates with the INP by sending proprietary CPML messages to the INP, seeking to determine how many virtual PCIe devices the INP supports. The CPML message contains an address that corresponds to the default entry in the aperture table 600, so that when the CPML message is received into the INP 610, it is applied to the aperture table and matched up with the address of the default entry, which then redirects all such CPML requests to the support processor 626 running management software. The support processor 626 is able to interpret any CPML request received from the device driver in the hypervisor 654 and act accordingly. After the support processor 626 receives the redirected request for the number of supported virtual PCIe devices, the support processor sends a response back to the device driver with an answer.

Because the device driver in the hypervisor 654 knows the number of guest OSs that have been instantiated, the number of virtual PCIe devices that the INP 610 supports, and that each guest OS expects to see a single PCIe device, the device driver will then send CPML messages to the support processor 626 through the default aperture table entry 658 to create the appropriate number and type of virtual PCIe devices within the INP. In particular, the virtual PCIe devices are created by creating a data structure in DDR memory to hold the "state" of a virtual PCIe device (such as the values of its registers, the number of BARs, and the like. (Note that the firmware contains the actual logic to emulate the virtual PCIe devices). The device driver also specifies certain properties of the virtual PCIe devices, such as how many virtual BARs are required, etc. Note that these virtual PCIe devices can be created on demand, so that if a new guest OS is added to the host at a later time, another virtual PCIe device can be created within the INP 610 at that time.

The support processor 626 also configures the aperture table 600 and creates an aperture entry for each BAR associated with each guest OS and corresponding to a newly created virtual PCIe device. The device driver, which knows each of the guest OSs and the address ranges of the BARs for each of the guest OSs, then sends further CPML messages (memory write messages) through the default aperture table entry 658 to the support processor 626, which configures the corresponding newly created aperture entries so that these addresses point to a processor such as the APEX 606, where a free processor within the APEX will be responsible for emulating the virtual PCIe device.

After the aperture table 600 has been populated with entries and the configuration phase is complete, the hypervisor 654 is bypassed, and subsequent data transfers occur directly between the drivers in the guest OSs 652 and the INP 610 through read and write commands. Read or write requests from a guest OS 652 are routed to the aperture table 600, and logic within the RC/EP module 602 applies the addresses of the requests to the aperture table and compares them with entries representing the BARs for that guest OS to determine if there is an entry having an address range (i.e. a "bin") encompassing the address of the request. If a match is found, the logic in the RC/EP module 602 performs the action associated with the enabled rules for the matching entry. For example, the entry may result in no further action being taken with regard to the request, or may result in an address translation. Alternatively, the entry may cause the logic to direct the request to one of the processors in APEX 606 via crossbar 610. A free processor in APEX 606 then executes the firmware necessary to emulate the performance of the virtual PCIe device associated with that particular entry and respond to the host 614 as though it were a physical PCIe device. The firmware may be stored in on-chip flash memory or off-chip memory.

The stored firmware routines executed by a processor in the INP 610 are preferably the same as the firmware device emulation programs 416 of FIG. 4. Note that unlike a hardware configuration header in which some of the fields are fixed (e.g. the length and type fields of each BAR), a processor and associated firmware can emulate the virtual configuration header 616 of a virtual PCIe device such that all of the fields can be programmable. In general, the processor and firmware may allocate additional configuration registers 622 and BARs 624 to the virtual PCIe device, up to the limits defined by the PCIe standard.

An example of the capability of hardware emulation pointed to in the aperture table 600 may be firmware that causes the emulation of a FC interface integrated circuit that has been in use for many years (here referred to as a "legacy product", not shown). OSs may have software drivers which have been fully tested and field proven (here referred to as "legacy drivers", not shown) for such legacy products. The aperture table 600 may have an entry denoting such a legacy product, and a corresponding emulation program in the programs 416, so that when the operating system in the host makes a request through the PCIe bus directed to the legacy product, the INP 610 responds by finding the appropriate entry in the aperture table 600. The APEX 606 may then execute the corresponding firmware emulation program in the programs 416 and transfer data messages through the APEX, so that the processor responds over the PCIe bus 612 as if the processor were the legacy product, and the software and firmware structures 410 respond to the legacy driver over the connections 474, 476, 478, 480, 482 and 436 as if the INP 610 were the legacy product.

If a new class of virtual PCIe device is to be emulated by the INP 610, the firmware resident in memory 646 (e.g. flash memory) either within the INP 610 or external to the INP may be upgraded by a server 648 external to the INP 610. After the firmware upgrade has been completed, a warm boot is performed, and the INP 610 provides an indication back to the host 614, indicating that a new configuration cycle should be commenced to enable the new virtual PCIe device to be discovered and configured, as described above. It should be understood, however, that a new virtual PCIe device of the same class can be supported without having to upgrade the firmware. This is same as when a new guest OS is booted on the host, and the hypervisor wants to create a new virtual device dynamically. In this case, new firmware or a warm reboot is not required.

As described above, in the example of FIG. 6 there are a number of guest OSs (requesters) 652, and each guest OS has a certain number of BARs with certain addresses. Furthermore, there are one or more aperture table entries 608 in the INP 610 corresponding to the BARs for each guest OS. All of this information for each guest OS is called a Requester Control Block (RCB) (which is a software data structure), and is stored in the DDR memory 630 by the management software running in the support processor 626. This data structure is accessible by all of the processors in the APEX 606, and is used when any of the drivers for one of the guest OSs 652 makes a read or write request.

An example of one use of the data structure will be described. Suppose that the host 614 has two guest OSs, OS1 and OS2. OS1 makes a read request to register A in its BAR to read some data from a particular virtual PCIe device, the aperture table entry for OS1 converts address A to address Y, and the request ends up being processed by the appropriate APEX processor. However, note that OS2 could have made the same request to read the same data from the same virtual PCIe device, but would have made that request to register K in its BAR. In that case, a different aperture table entry for OS2 would have translated address K to address Z, and the request would have been processed by the same or a different APEX processor. In such a situation, the APEX processor needs to know which guest OS made the read request. The RCB can be used to make this determination, because the requester database would show that a request with a converted address in the range of A to H (representing a particular aperture table entry) comes from OS1, while a request with a converted address in the range of I to O (representing a different particular aperture table entry) comes from OS2. Depending on the requestor, the data may be returned (in the case of a read) in a different way.

Figure 7:
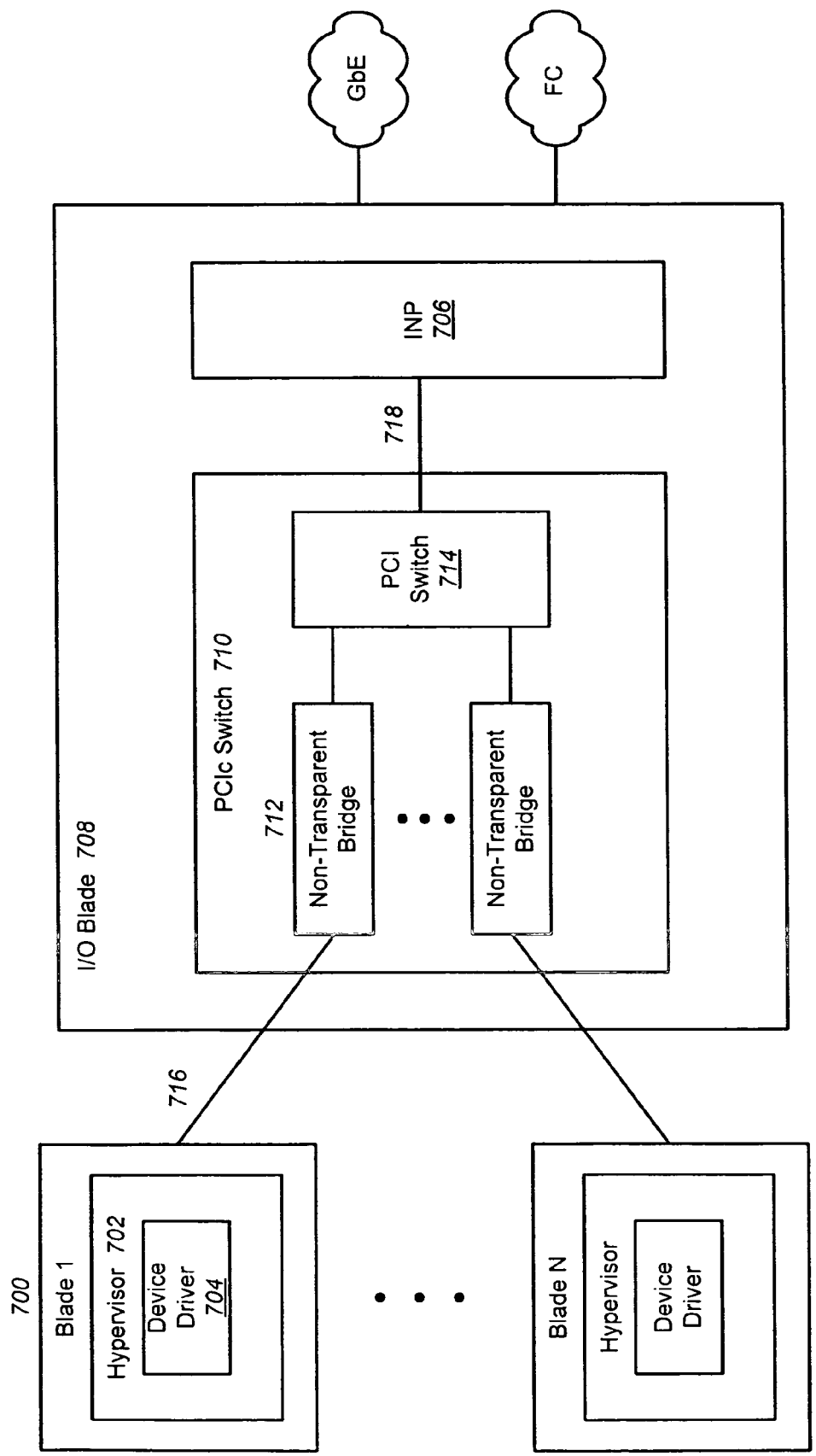
FIG. 7 illustrates an exemplary multi-root system according to embodiments of the present invention.

FIG. 7 illustrates an exemplary multi-root system according to embodiments of the present invention. The system of FIG. 7 includes multiple blades 700, each with a device driver 704, and optionally a hypervisor 702. An INP 706, as described above, is situated in an I/O blade 708, which also contains a PCIe switch subsystem 710. The PCIe switch subsystem 710 further includes one non-transparent bridge 712 for each blade 700, and a standard PCIe switch device 714. In one embodiment, the PCIe switch is PLX 8532. Each non-transparent bridge has a virtual side and a physical side. Each of the blades 700 has a PCIe connection 716 to a virtual side of a non-transparent bridge 712, and the physical side of each non-transparent bridge is connected to the standard PCI switch device 714. The INP 706 is connected to the standard PCI switch device via connection 718. In the multi-root system of FIG. 7, both the blades 708 and the INP 706 are considered to be root complexes. However, as far as each blade 700 is concerned, each connection to its corresponding non-transparent bridge 712 is like an endpoint, because each blade thinks it is attached to a single PCIe device.

When each blade 700 is powered up and runs through its configuration cycle and discovery process, it independently discovers one device in the form of its corresponding non-transparent bridge 712, and configures the non-transparent bridge by setting up its configuration space, including the BARs and other configuration registers. The non-transparent bridge then terminates the configuration cycle.

Because there is no central entity in the multi-root system of FIG. 7 to configure the virtual PCIe devices in INP 708, the INP must perform this configuration task. One of the processors in the INP 708 (e.g. the support processor), under control of firmware that may be stored in flash, performs register reads across connection 716 to read the configuration registers of each non-transparent bridge 712 and determine what each of the blades has configured as its BARs. After reading the BARs for the blades, it creates an entry in the aperture table for each BAR. Note also that each non-transparent bridge 712 can translate addresses from one domain to another, so in simple terms is an address translation device. This address translation is necessary in the multi-root system of FIG. 7, because the configuration space independently established by each of the blades 700 may be overlapping with the configuration space of other blades. The translation from the configuration space known to each blade 700 to the configuration space for the virtual PCIe device associated with that blade, occurs in the non-transparent bridges 712. The INP firmware actually goes out over the PCIe bus and programs each bridge to perform the address translation properly.

After the system is configured, each blade can talk to its own virtual PCIe device through the one or more aperture entries corresponding to the BARs for the blade, and each blade can operate independently (e.g. perform reads/writes independent of the other blades). The way that the INP maintains the requestor information, and how the APEX responds to the requests, is the same as described above for the single-root system.

Figure 8:
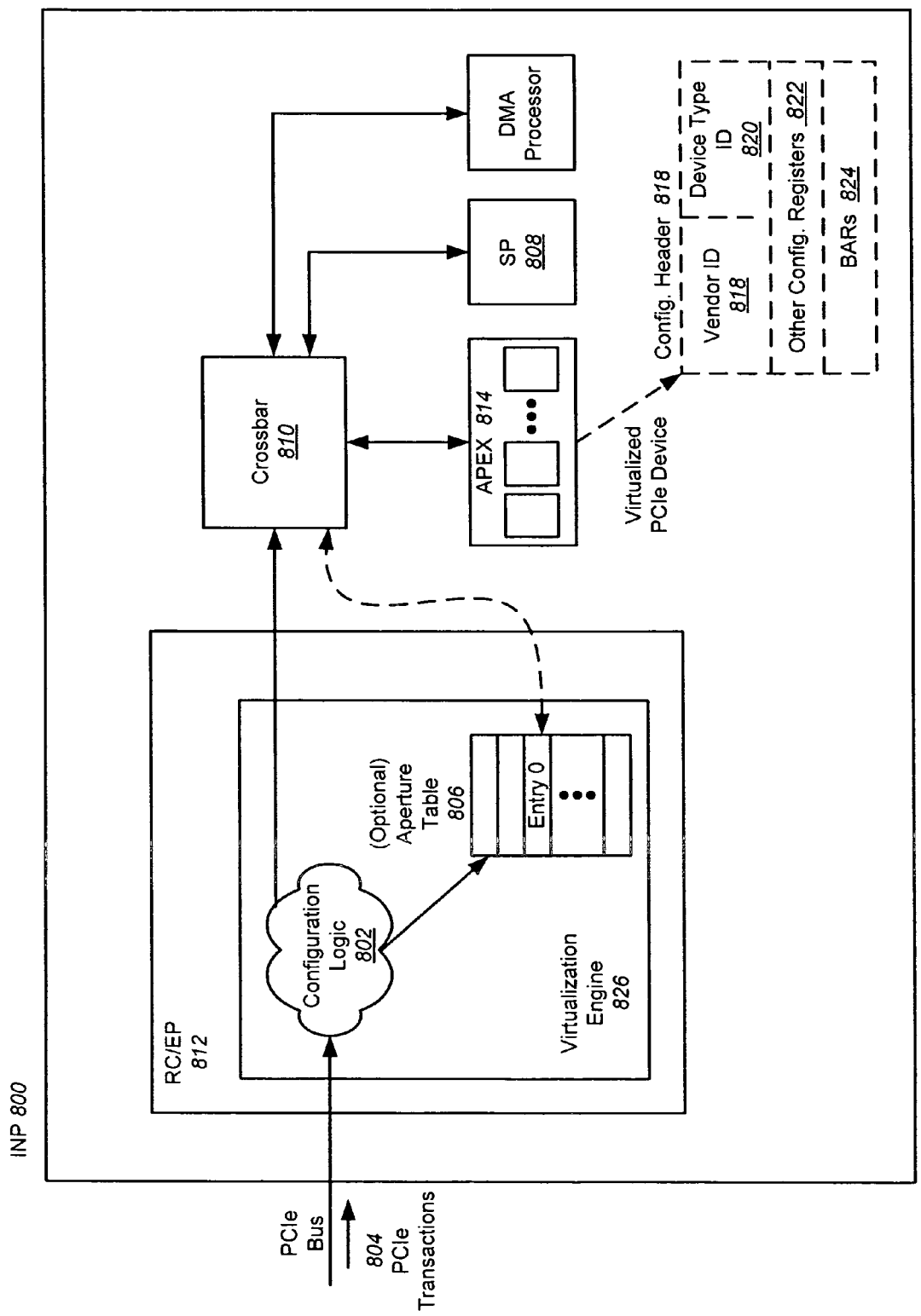
FIG. 8 is an illustration of an exemplary intelligent network processor utilizing programmable configuration logic according to embodiments of the present invention.

FIG. 8 is an illustration of an exemplary system employing an INP 800 with virtualization logic 826 comprised of programmable configuration logic 802 according to embodiments of the present invention. In the alternative embodiment of FIG. 8, the configuration logic 802 may replace the aperture table described above, or may work together with the aperture table. Note that in this alternative embodiment there are no hardware configuration registers in the RC/EP 812 that terminate configuration cycles from the host.

In the embodiment of FIG. 8, when PCIe transactions 804 are presented to the RC/EP 812, the headers are evaluated by the configuration logic 802 to determine the classification of the PCIe transaction (i.e. the type of cycle). Depending on the classification, the configuration logic 802 may take no further action with regard to the PCIe transaction, may direct the transaction to a processor via crossbar 810, or may perform an address translation. For example, if the configuration logic 802 determines that a discovery or configuration request (i.e. a configuration cycle) is being presented, the discovery or configuration request is passed through the crossbar 810 to the APEX 814. A free processor in the APEX 814 then executes firmware to respond to and terminate the configuration cycle by providing information and indications back to the host indicating that virtual PCIe devices have been discovered and configured. The particular processor and firmware performs translations from the configuration space of the requestor to the virtual configuration space of the virtual PCIe device being emulated.

In an alternative embodiment in which an aperture table 806 and configuration logic 802 are both present in the RC/EP 812, the configuration logic may be simplified to detect configuration cycles and redirect all configuration cycles to the aperture table, which then makes a further redirection to one of the processors, which responds to and terminates the configuration cycle as discussed above.

For example, a discovery request may be redirected to the APEX 814 through crossbar 810 by aperture table entry 0 representing the BAR for a particular guest OS. A free processor in the APEX 814 then executes firmware designed to emulate the configuration registers in the configuration header 816 of the particular virtual PCIe device. The processor then provides the contents of an emulated vendor ID register 818 and an emulated device type ID register 820 in response to the discovery request. The processor also provides the contents of other emulated configuration registers 822 to determine how many blocks of memory the particular virtual PCIe device requires.

The host then sends configuration requests that attempt to assign memory space to the virtual PCIe device by assigning addresses to the BARs 824 of that PCIe device. However, these configuration requests are also redirected to the APEX 814 in accordance with aperture table entry 0, which receives the addresses and stores them in the emulated BARs 824 of the particular virtual PCIe device.

Conventional storage processors have provided 1, 2, and 4 Gb FC, 1 GbE and 10 GbE MACs all on the same chip. However, this was accomplished was through the inefficient replication of functions. For example, four MACs have been replicated, each one programmable for 1, 2 or 4 GbFC, and another four MACs have been replicated for 1 GbE. For each of these eight MACs, a separate SERDES was employed off-chip.

Referring again to FIG. 3, embodiments of the present invention include on-chip SERDES 366 and 376, each SERDES capable of handling multiple (e.g. four) combined GbFC and GbE interfaces (e.g. 1, 2 and 4 GbFC and 1 GbE), one for each CMAC, and capable of being trunked to provide a XAUI. In other words, multiple CMACs can be configured using support logic to operate in synchronism and cooperation with each other, splitting the signals between them so that a higher speed (e.g. 10 GbFC) can be achieved, with each SERDES effectively running at some intermediate rate (e.g. 3.125 GbFC). For example, when the four SERDES in block 366 are considered together as a four line trunk using the FC protocol, the overall throughput is 10 GbFC using the particular bit signaling set by the FC physical standard. The same thing holds true for Ethernet. Four trunks considered together produce 10 GbE using the Ethernet packet format and physical layer signaling methods set by the 10 GbE standard. In addition to concurrently using all four of the CMACs as one bonded port, each CMAC is independently programmable and each may be configured to operate at a different speed and a different protocol.

Figure 9:
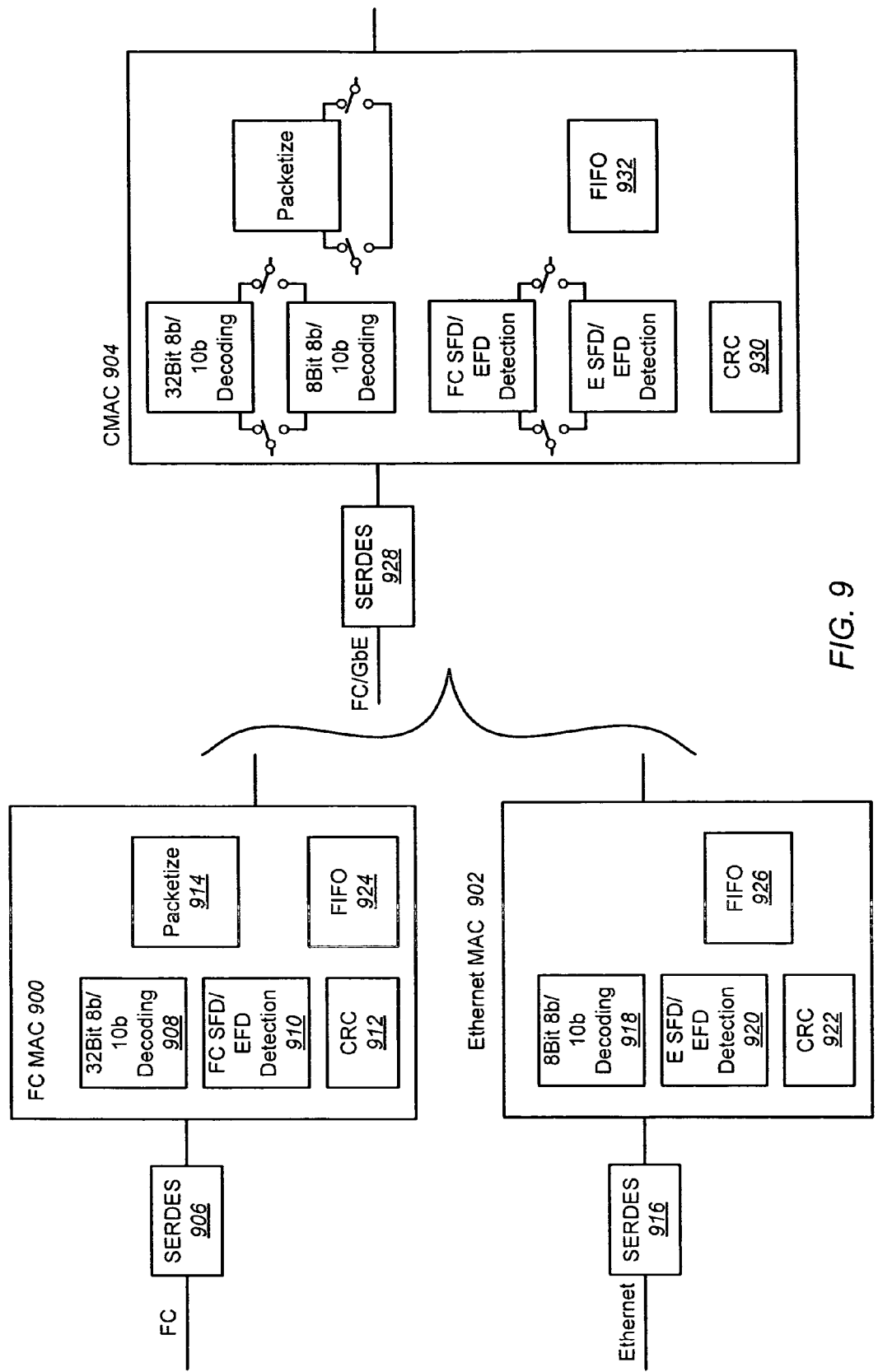
FIG. 9 is an illustration of how the common processing elements of Media Access Controllers for Fibre Channel and Gigabit Ethernet can be integrated into an efficient combined media access controller according to embodiments of the present invention.

FIG. 9 is an illustration of how the common processing elements of MACs for FC 900 and MACs for GbE 902 can be integrated into an efficient CMAC 904 according to embodiments of the present invention. Conventionally, FC frames are received and deserialized by SERDES 906, and are then processed by a FC MAC 900. This processing typically includes 32-bit 8b10b decoding 908, detection of a SFD (a.k.a. a "k" character) and an EFD 910, CRC 912, generating packets from the FC frames 914, and buffering in a FIFO buffer 924. Similarly, GbE packets are received and deserialized by SERDES 916, and are then processed by a GbE MAC 902. This processing typically includes 8-bit 8b10b decoding 918, detection of a SFD and an EFD 920, CRC 922, and FIFO buffering 926.

Because of the processing similarities, embodiments of the present invention integrate the data paths for both the FC and GbE protocols in a FC/GbE CMAC 904. Both protocols require SERDES 928, CRC 930 and FIFOs 932 for rate matching, and thus the logic for these tasks is shared in the CMAC 904. However, because the logic (state machine) to perform 8b10b decoding, to detect SFDs and EFDs for each protocol, and to packetize FC frames is different for the two protocols, this logic must be duplicated and switched in or out as needed. To produce a FC/GbE CMAC, multiple bytes must be framed as packets (even though FC uses "frame" terminology). The bytes in a packet are well-defined in the FC and GbE standards. After the SFDs have been detected, logic specific to each protocol may be employed outside the CMAC and switched in or out depending on the protocol to parse the bytes in the packet. The CMACs are configurable by a processor to decode the incoming packets or frames as either FC "packets" or GbE packets.

Most conventional GbE MACs have an address filtering feature. With address filtering, rules can be set in the MAC to not accept certain 16-bit MAC addresses or certain multicast addresses. (With multicast addresses, only a particular group of devices will receive a certain address if a certain bit is set, and each device must be configured to be part of the multicast group. A device could be part of more than one multicast group.) Each MAC can be configured to filter packets and to receive only one MAC address (because each MAC has one MAC address assigned to it), and to perhaps receive one or more multicast addresses. Other rules could be set such that the MAC could receive packets only from certain addresses, or that the MAC will not receive from a particular address, but will receive from all other addresses. These rules could be used in various combinations. It is up to the device software as to what rules are to be set in each MAC. Conventional MACs support these configurable rules by having configurable registers in hardware, so the rules are limited by limited hardware (e.g. 16 registers would limit the MAC to rules involving not more than 16 addresses).

Figure 10:
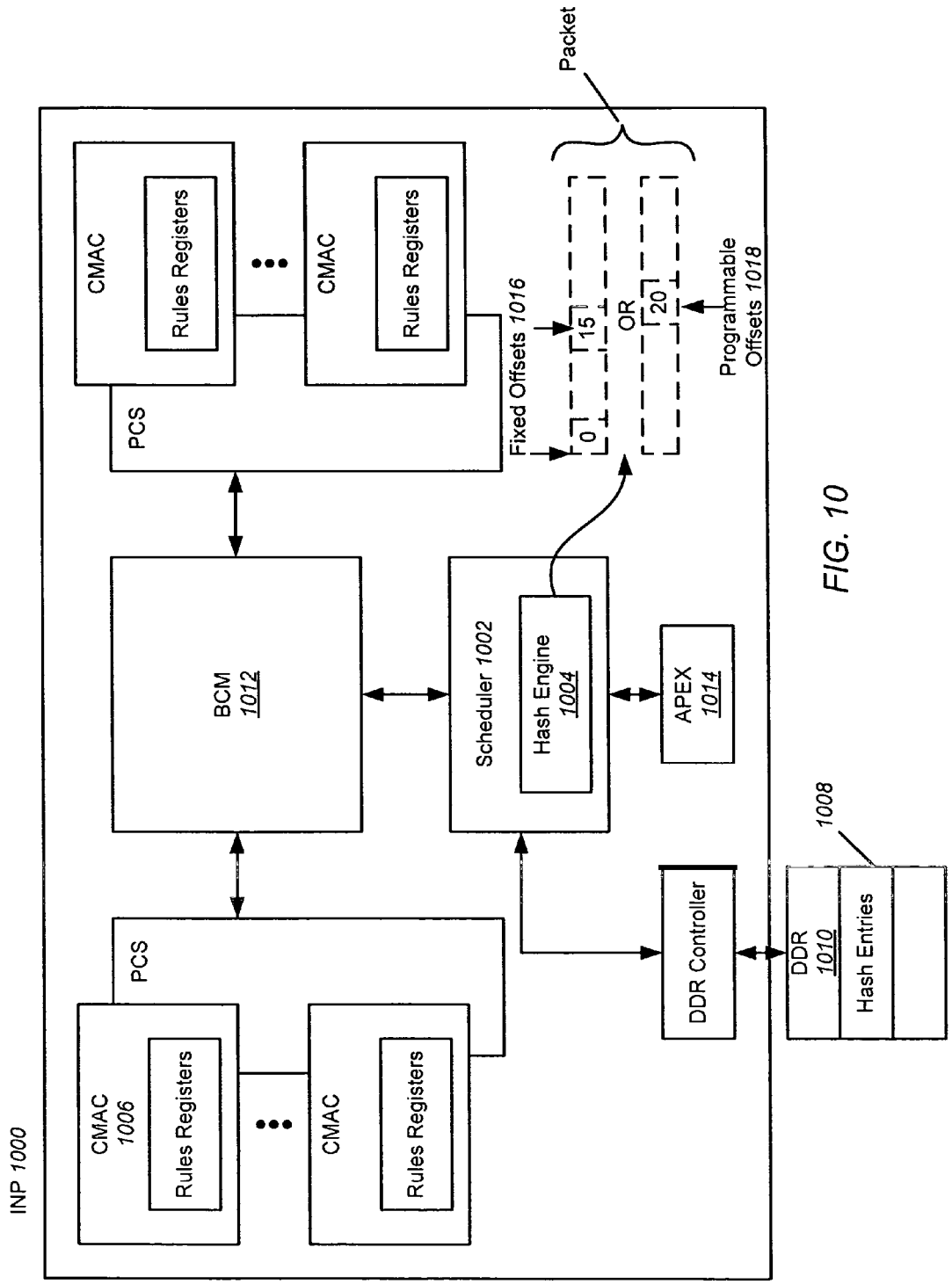
FIG. 10 illustrates an exemplary intelligent network processor employing a hashing scheme for Combined Media Access Controller filtering according to embodiments of the present invention.

FIG. 10 illustrates an exemplary INP 1000 employing a hashing scheme for CMAC filtering according to embodiments of the present invention. Note that the representation of INP 1000 of FIG. 10 corresponds to the INP of FIG. 3, but is simplified to emphasize the hashing scheme. In the hashing scheme of FIG. 10, the hashing rules are made scalable without adding hardware, so each CMAC can have many more rules than their hardware registers would allow. In the embodiment of FIG. 10, the scheduler 1002 includes a hash engine 1004. Sophisticated hashing rules can be set for the hash engine 1004. For example, if a CMAC 1006 wants to accept any packet having one of 2 k destination MAC addresses, the hash engine 1004 can be configured such that for every one of the 2 k destination MAC addresses, a hash entry 1008 is created in off-chip DDR 1010. The DDR 1010 can store a large number of hash entries 1008 to achieve scalability. The hash entries 1008 are created at startup, during configuration, when a host configures the INP 1000 to receive the 2 k destination MAC addresses.

After the hash entries 1008 are created, if a packet is subsequently received on CMAC 1006 containing one of the 2 k destination MAC addresses, it enters the BCM 1012 and is routed to the scheduler 1002. The scheduler 1002 will do a hash of the destination MAC address in the packet, and attempt to match it with one of the hash entries 1008 in DDR 1010. This is performed by a hardware state machine, so no firmware is required. Although external memory is involved, hardware prefetching is utilized, and thus it may be done at near wire speeds. If a match is found, the packet is then forwarded to one of the APEX processors 1014. On the other hand, if a packet is received that does not have one of the 2 k destination MAC addresses, a bit in the packet is set indicating a "hash miss." The packet is thereafter still forwarded to the APEX block 1014, but the APEX firmware will detect the hash miss bit and know that the packet was not to be received, so the packet is discarded.

In further embodiments of the present invention, the CMAC filtering can be protocol independent. In MACs designed for a single protocol, the hashing logic in hash engine 1004 knows that the address of a received packet is at a certain offset (e.g. offset 0), and the source address is at offset 15, for example. In MACs designed for a single protocol, these offsets are hardwired into the hashing logic, as shown at 1016. In other embodiments of the present invention, the offsets are programmable, so for example the hashing logic could be configured to look for a field at offset 20, and read 16 bits from that offset, as shown at 1018, to accommodate the addressing of any protocol. It is therefore flexible in where it looks for addresses.

A routing operation can be described using an example. Referring to FIG. 3, suppose that CMAC 340 in INP 310 was set to 4GbFC, operating independently, and that CMAC 348 was set to 1 GbE, operating independently. A FC packet is received at CMAC 340 and is routed to the crossbar 312, which then determines that it should be routed to the APEX 316. When the APEX 316 receives the packet, it determines that the FC packet is supposed to go out of the INP 310 as an Ethernet packet, and thus a conversion from a FC packet to an Ethernet packet (which includes identifying the various fields in the FC packet, removing error correction control bits, and putting the packet back together as an Ethernet packet with the correct addresses and error checking) is performed internal to the INP 310 without communicating with an off-chip host. The APEX 316 is able to perform this protocol conversion because it was programmed ahead of time by a host to perform a FC to Ethernet packet conversion if a FC packet is received at CMAC 340 with a particular destination address. When the protocol conversion is complete, the flow identification/scheduler 314 then sends the Ethernet packet out through CMAC 348 corresponding to the destination address of the packet.

A switching operation can also be described using an example. Suppose a FC packet is received at CMAC 342, and it is routed to the crossbar 312, which extracts the contents of the packet to determine the destination for the packet. In particular, the packet has a destination address, and the crossbar 312 must determine the corresponding destination port. A lookup table may be fetched from off-chip memory that contains preconfigured information that identifies the port number at which the destination address is located. The destination address of the packet is applied to the lookup table to determine the port number to which the packet needs to be forwarded/switched. In this mode, the INP 310 operates like a FC switch.

Previous designs have performed FC to FC switching operations using MACs and a controllable crossbar to determine the destination port based on the contents of the packet, but switching operations combined with the protocol conversion of a routing operation has not previously been performed. Previous designs also did not have a RC/EP module connected directly to the crossbar.

Thus, in one embodiment of the present invention, the INP 310 is configurable to perform a switching operation with on-chip FC to Ethernet (and vice versa) conversion without having the data leave the crossbar 312. The headers of the packet may be modified, but the data is left alone, repacked into a different frame, and shipped out a destination port. The conversion is a firmware function with a hardware assist.

For example, a request for a configuration of a GbE pathway between connections 372 and 368 may be provided by a host computer through the PCIe bus 364. The RC/EP 356 would respond on the PCIe bus to the host computer, and would utilize its aperture table and/or configuration logic to cause the APEX 316 to activate the scheduler 314 to set the appropriate pathways in the crossbar BCM 312 to move data between CMAC 344 and CMAC 340, and to cause PCS 322 to cause CMAC 344, CMAC 340, and the connections 372 and 368 of interface 344 to use the GbE protocol. Simultaneously, the host computer could make a request to have a 10 Gbps FC pathway between the connections 378, 380, 382, and 384 in a XAUI arrangement, with the pathway leading to the PCIe bus 364 itself, thus using the INP 310 as a HBA for that configuration. The RC/EP 356 would further respond by utilizing its aperture table and/or configuration logic to cause the APEX 316 to activate the scheduler 314 to set the appropriate pathways in the crossbar BCM 312 to move data between the PCS 334 and the RC/EP 356, and to cause PCS 334 to cause CMAC 348, 350, 352, and 354, and the connections 378, 380, 382, and 384 to use the FC protocol in a XAUI arrangement.

Additionally, as discussed above and as shown in FIG. 3, the RC/EP module 356 is connected directly to the crossbar 312, enabling the RC/EP to function as another packet destination or source. In other words, instead of being able to switch only between SERDES ports, PCIe is now a potential source and destination of the data packets.

Conventional BCMs utilize the concept of credits for their ports. Credits are essentially the number of free buffers at a particular port. For example, if a port on a BCM has eight credits, eight frames of data could be received into that port and stored in the buffers without having to send an acknowledgement. One credit is consumed when a packet is received, and one credit is released when a packet is sent it out of the crossbar through that port. Normally the credits for each of the ports are part of the crossbar, in on-chip memory. However, on-chip memory is expensive, and thus traditionally the number of credits allocated to the ports on a BCM has been limited. This is sufficient for short-haul communications, but when using the links for long-haul purposes such as distance of 100 km, many packets may be in the pipe, so more credits are needed per port. Increasing the size of the on-chip crossbar is expensive. However, external memory has traditionally not been used to store credits because it would be too slow to control the external memory.

Figure 11:
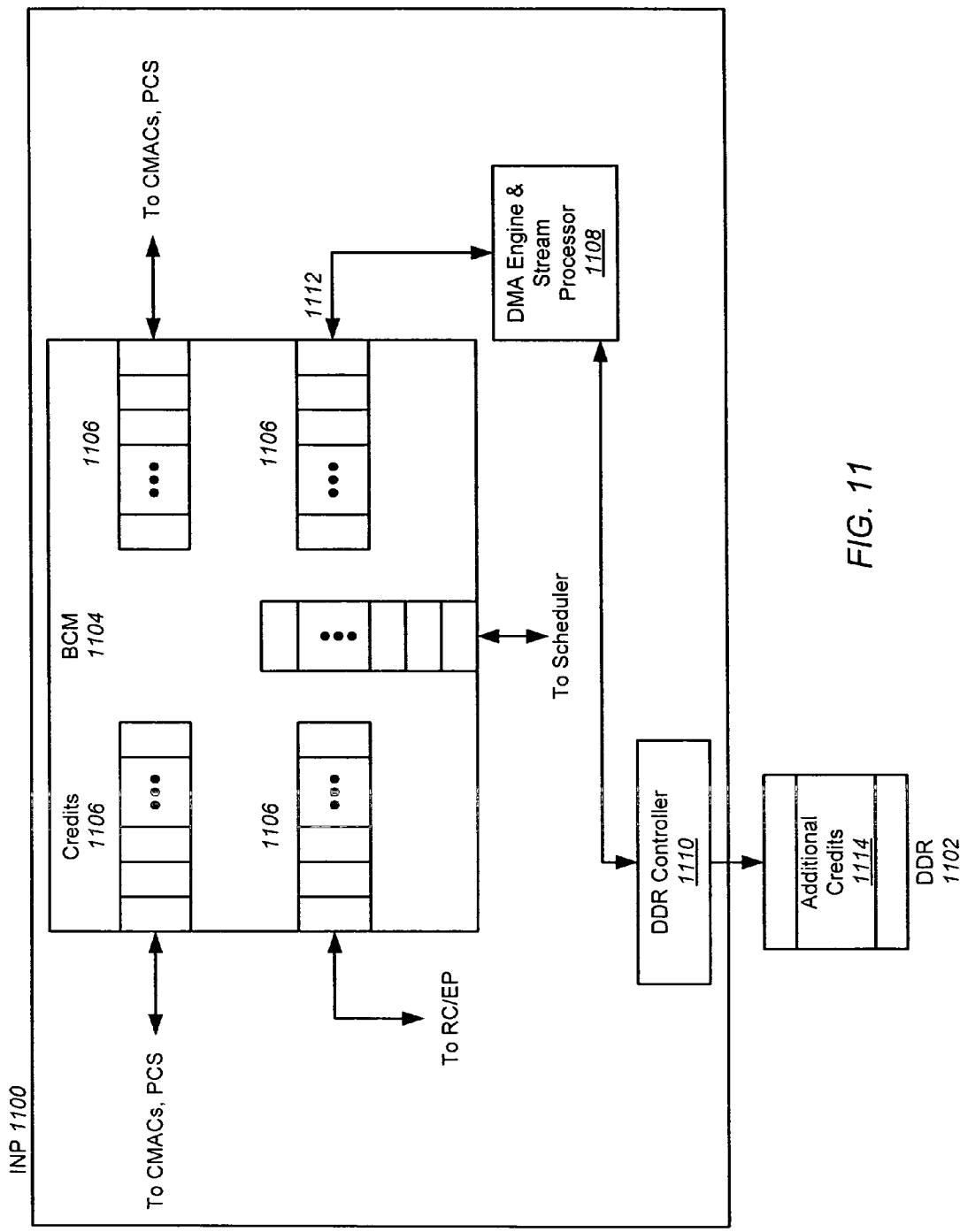
FIG. 11 is an illustration of an intelligent network processor employing crossbar credit extensions according to embodiments of the present invention.

FIG. 11 is an illustration of an INP 1100 employing crossbar credit extensions according to embodiments of the present invention. In FIG. 11, a BCM 1104 has multiple ports, each port having a number of credits 1106 for buffering frames as they pass through the BCM 1104. The credit extensions of the present invention extend the number credits available to each port on the BCM 1104 using off-chip memory 1102. As a result, on a port by port basis, more credits can be configured than are available in the crossbar memory 1104. The external DDR memory 1102 is treated as another port on the crossbar 1104, or just an extension of the crossbar. When crossbar logic in the BCM 1104 determines that more credits are needed for a particular port, the crossbar logic will make a request to the DMA block 1108, which has access to the off-chip DDR memory 1102 through the DDR controller 1110, to effectively gain access to additional credits 1114.

The DMA engine 1108 treats the off-chip DDR memory 1102 as though it were on-chip memory. When more credits are needed, the off-chip DDR 1102 can be accessed through a port 1112 on the crossbar 1104 and through the DMA engine 1108 to store frames in the DDR 1102 and effectively consume additional credits. Note that this is performed using gates, because the message frames are received so fast that processors would not be able to selectively decide what frames to put in DDR 1102 and which ones to receive from DDR. Instead, the DMA engine 1108 does this work.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An intelligent network processor (INP) for connection to a PCI express (PCIe) bus, comprising:
   one or more processors for emulating one or more virtual PCIe devices supported by the INP; and
   a Root Complex/EndPoint (RC/EP) module communicatively couplable to the PCIe bus and to the one or more processors for receiving communications over the PCIe bus, the RC/EP module including a virtualization engine providing a hardware window through which entities on the PCIe bus can communicate with the one or more processors to configure the one or more virtual PCIe devices and send read and write requests to the one or more virtual PCIe devices.

2. The NP as recited in claim 1, further comprising a host bus interface coupled to the RC/EP module and couplable to the PCIe bus for connecting the RC/EP module to the PCIe bus.

3. The NP as recited in claim 1, further comprising a Bi-directional Crossbar Module (BCM) couplable to the RC/EP module and the one or more processors for routing communications between the RC/EP module and the one or more processors.

4. The NP as recited in claim 1, further comprising firmware executable by the one or more processors for programmably emulating all fields in a configuration header of the one or more virtual PCIe devices.

5. The INP as recited in claim 1:
the RC/EP module further comprising a PCIe core for terminating configuration cycles directed to the INP; and
the virtualization engine within the RC/EP module comprising an aperture table for storing entries corresponding to the one or more virtual PCIe devices supported by the NP and also corresponding to Base Address Registers (BARs) in a configuration space of Operating Systems (OSs) in communication with the NP over the PCIe bus, the aperture table for redirecting communications received over the PCIe bus to a processor appropriate for processing that communication.

6. The INP as recited in claim 5, each aperture table entry comprising:
an address field including a base address field and a length field that together represent an address range for that entry; and
a destination field for storing an address of a processor that will be emulating the virtual PCIe device associated with that entry.

7. The NP as recited in claim 5, each aperture table entry comprising one or more programmable rules.

8. The NP as recited in claim 6: the one or more processors further comprising
a support processor for assisting in configuring the one or more virtual PCIe devices supported by the NP; and
the aperture table including a default entry for redirecting configuration communications received over the PCIe bus to the support processor.

9. The NP as recited in claim 8, the support processor for creating the aperture table entries in response to messages received over the PCIe bus.

10. The INP as recited in claim 8, the support processor for storing addresses in the address fields of the aperture table entries in response to messages received over the PCIe bus.

11. The INP as recited in claim 8, the RC/EP module further comprising logic for comparing addresses in communications received over the PCIe bus to the address field of one or more entries in the aperture table, and if there is a match, redirecting the communications to the address in the destination field of the matching entry.

12. The INP as recited in claim 1, wherein the INP is coupled to a memory for storing Requestor Control Blocks (RCBs) containing configuration information accessible by the one or more processors when responding to communications received over the PCIe bus.

13. The INP as recited in claim 1, the INP formed on a single chip.

14. The INP as recited in claim 13, the INP forming a part of a single-root system configuration comprised of a single root, complex coupled to one or more endpoints, the INP representing one of the endpoints.

15. The INP as recited in claim 14, the single root complex comprising a single host partitioned into one or more guest OSs managed by a hypervisor.

16. The INP as recited in claim 13 and located on an I/O blade.

17. The INP as recited in claim 16, the I/O blade forming a part of a multi-root system configuration comprised of multiple coupled root complexes, the INP representing one of the root complexes.

18. The INP as recited in claim 17, the I/O blade further comprising a PCIe switch subsystem coupled between the INP and other root complexes, the PCIe switch subsystem including a PCI switch coupled to the INP and one non-transparent bridge coupled to each of the other root complexes, each non-transparent bridge for storing the configuration space of its associated root complex and for terminating a configuration cycle initiated by the associated root complex.

19. The INP as recited in claim 18, the one or more processors configured for sending read requests to each of the non-transparent bridges in the PCIe switch subsystem to read the BARs of each root complex and create entries in the aperture table corresponding to each BAR.

20. The INP as recited in claim 1, the virtualization engine within the RC/EP module comprising configuration logic for evaluating headers of received PCIe communications to determine a response to that communication.

21. The INP as recited in claim 20, wherein the configuration logic redirects the communication to a processor for processing that communication, and in the case of a configuration cycle, terminating the configuration cycle.

22. The INP as recited in claim 5, the virtualization engine within the RC/EP module comprising configuration logic for evaluating headers of received PCIe communications to determine a response to that communication.

23. The INP as recited in claim 22, wherein the configuration logic redirects the communication to the aperture table for further redirection.

24. A method for virtualizing PCIe devices, comprising:
emulating one or more virtual PCIe devices utilizing one or more processors;
receiving PCIe communications over a PCIe bus;
providing a hardware window through which entities on the PCIe bus can communicate with the one or more processors to configure the one or more virtual PCIe devices and send read and write requests to the one or more virtual PCIe devices.

25. The method as recited in claim 24, further comprising programmably emulating all fields in a configuration header of the one or more virtual PCIe devices.

26. The method as recited in claim 25, further comprising:
terminating configuration cycles at a level of the hardware window;
storing entries in an aperture table acting as the hardware window, the entries corresponding to the one or more virtual PCIe devices and also corresponding to Base Address Registers (BARs) in a configuration space of Operating Systems (OSs) in communication with the virtual PCIe devices over the PCIe bus; and
redirecting communications received over the PCIe bus to a processor for processing that communication utilizing the aperture table entries.

27. The method as recited in claim 26, the step of storing entries in the aperture table comprising:
storing an address field including a base address field and a length field that together represent an address range for that entry; and
storing a destination field for storing an address of a processor that will be emulating the virtual PCIe device associated with that entry.

28. The method as recited in claim 26, the step of storing entries in the aperture table comprising storing one or more programmable rules in each entry.

29. The method as recited in claim 27, further comprising:
assisting in configuring the one or more virtual PCIe devices utilizing a support processor; and
creating a default entry in the aperture table for redirecting configuration communications received over the PCIe bus to the support processor.

30. The method as recited in claim 29, further comprising creating the aperture table entries in response to messages received over the PCIe bus using the support processor.

31. The method as recited in claim 30, further comprising storing addresses in the address fields of the aperture table entries in response to messages received over the PCIe bus.

32. The method as recited in claim 30, further comprising comparing addresses in communications received over the PCIe bus to the address field of one or more entries in the aperture table, and if there is a match, redirecting the communication to the address in the destination field of the matching entry.

33. The method as recited in claim 24, performed within a single chip.

34. The method as recited in claim 33, performed in an endpoint in a single-root system configuration comprised of a single root complex coupled to one or more endpoints.

35. The method as recited in claim 34, performed in an endpoint in a single root system configuration wherein the single root complex includes a single host partitioned into one or more guest OSs managed by a hypervisor.

36. The method as recited in claim 33, performed within an I/O blade.

37. The method as recited in claim 36, performed within a multi-root system configuration comprised of multiple coupled root complexes.

38. The method as recited in claim 37, further comprising:
coupling at least one of the multiple root complexes to a non-transparent bridge within a PCIe switch;
storing the configuration space of a root complex in its associated non-transparent bridge; and
terminating a configuration cycle initiated by its associated root complex within the non-transparent bridge.

39. The method as recited in claim 38, further comprising sending read requests to each of the non-transparent bridges in the PCIe switch to read the BARs of each root complex and create entries in the aperture table corresponding to each BAR.

40. The method as recited in claim 24, further comprising evaluating headers of received PCIe communications in configuration logic acting as the hardware window to determine a response to that communication.

41. The method as recited in claim 40, further comprising redirecting the communication to a processor for processing that communication using the configuration logic, and in the case of a configuration cycle, terminating the configuration cycle.

42. The method as recited in claim 27, further comprising redirecting the communication to the aperture table using the configuration logic for further redirection.

43. One or more storage media including a computer program which, when executed by one or more processors in an intelligent network processor (INP), assists in enabling the INP to emulate multiple virtual PCIe devices by causing the one or more processors to perform the steps of:
emulating one or more fields in a configuration header of one or more virtual PCIe devices; and
storing entries in an aperture table acting as a hardware window through which entities on the PCIe bus can communicate with the one or more processors to configure the one or more virtual PCIe devices and send read and write requests to the one or more virtual PCIe devices, the entries corresponding to the one or more virtual PCIe devices and also corresponding to Base Address Registers (BARs) in a configuration space of Operating Systems (OSs) in communication with the virtual PCIe devices over the PCIe bus.

44. The one or more storage media as recited in claim 43, wherein the computer program, when executed by the one or more processors, further causes the one or more processors to perform the step of storing entries in the aperture table by:
storing an address field including a base address field and a length field that together represent an address range for that entry; and
storing a destination field for storing an address of a processor that will be emulating the virtual PCIe device associated with that entry.

45. The one or more storage media as recited in claim 43, wherein the computer program, when executed by the one or more processors, further causes the one or more processors to perform the step of: creating a default entry in the aperture table for redirecting configuration communications received over the PCIe bus to a support processor.

46. The one or more storage media as recited in claim 45, wherein the computer program, when executed by the one or more processors, further causes the one or more processors to perform the step of storing addresses in the address fields of the aperture table entries in response to messages received over the PCIe bus.

47. The one or more storage media as recited in claim 46, wherein the computer program, when executed by the one or more processors, further causes the one or more processors to perform the steps of sending read requests to each non-transparent bridge in a PCIe switch in a multi-root system configuration to read Base Address Registers (BARs) of each root complex coupled to the non-transparent bridge, and create entries in the aperture table corresponding to each BAR.

48. An intelligent network processor (INP) for connecting to a Fibre Channel (FC) protocol fabric, a Gigabit Ethernet (GbE) protocol fabric and to a host computer, comprising:
a plurality of port interfaces for connection to a protocol fabric, and adjustable to be selectively compatible with FC or GbE;
a plurality of Combined Media Access Controller (CMAC) modules, with each CMAC connected to a corresponding port interface, and adjustable to be selectively compatible with FC or GbE; and
an Application Processor (APEX) module connected to each port interface for selecting between support for FC or GbE, and connected to each CMAC for selecting between support for FC or GbE, and enabled to execute firmware for responding to protocol designation messages from the host computer, FC messages from a CMAC through its corresponding port interface, and GbE messages from a CMAC through its corresponding port interface.

49. The INP as recited in claim 48:
wherein a Protocol Coordination Stage (PCS) module is connected to a plurality of CMAC modules and is connected to the APEX module for coordinating an operation of the plurality of CMAC modules in a single trunk connected to the corresponding plurality of port interfaces;

wherein the APEX module provides protocol control signals to the PCS and each of the plurality of CMAC modules and corresponding port interfaces connected to the CMAC modules in order to select between FC and GbE and to command when the PCS module is to start and stop the coordination of the trunk formed by the plurality of CMAC modules connected to the PCS.

50. The INP as recited in claim 49, wherein the PCS is capable of coordinating the plurality of CMAC connected to the PCS to form a FC XAUI trunk for connection to a 10 Gb FC protocol fabric through the plurality of port interfaces corresponding to each CMAC connected to the PCS.

51. The NP as recited in claim 49, wherein the PCS is capable of coordinating the plurality of CMAC connected to the PCS to form a GbE XAUI trunk for connection to a 10 GbE protocol fabric through the plurality of port interfaces corresponding to each CMAC connected to the PCS.

52. The INP as recited in claim 48, wherein each CMAC comprises:
   switchable 32-bit FC 8B10b decoding logic and 8-bit GbE 8b10b decoding logic;
   switchable FC and GbE Start of Frame Delimiter (SFD) and End of Frame Delimiter (EFD) detection logic;
   common Cyclic Redundancy Check (CRC) logic;
   common packetizing logic; and
   common First In First Out (FIFO) buffering.

53. A method for connecting to a Fibre Channel (FC) protocol fabric, a Gigabit Ethernet (GbE) protocol fabric and to a host computer, comprising:
   providing a plurality of adjustable port interfaces selectively compatible with FC or GbE for connection to a protocol fabric;
   providing a plurality of adjustable Combined Media Access Controller (CMAC) modules selectively compatible with FC or GbE, each CMAC connected to a corresponding port interface; and
   connecting an Application Processor (APEX) module to each port interface and to each CMAC for selecting between support for FC or GbE, the APEX module enabled to execute firmware for responding to protocol designation messages from the host computer, FC messages from a CMAC through its corresponding port interface, and GbE messages from a CMAC through its corresponding port interface.

54. The method as recited in claim 53, further comprising:
   connecting a Protocol Coordination Stage (PCS) module to a plurality of CMAC modules and to the APEX module for coordinating an operation of the plurality of CMAC modules in a single trunk connected to the corresponding plurality of port interfaces; and
   providing protocol control signals from the APEX module to the PCS, the plurality of CMAC modules and corresponding port interfaces connected to the CMAC modules in order to select between FC and GbE and to command when the PCS module is to start and stop the coordination of the trunk formed by the plurality of CMAC modules connected to the PCS.

55. The method as recited in claim 54, further comprising coordinating the plurality of CMAC modules connected to the PCS to form a FC XAUI trunk for connection to a 10 Gb FC protocol fabric through the plurality of port interfaces corresponding to each CMAC connected to the PCS.

56. The method as recited in claim 54, further comprising coordinating the plurality CMAC modules connected to the PCS to form a GbE XAUI trunk for connection to a 10 GbE protocol fabric through the plurality of port interfaces corresponding to each CMAC connected to the PCS.

57. The method as recited in claim 53, further comprising forming each CMAC by:
   providing switchable 32-bit FC 8B10b decoding logic and 8-bit GbE 8b10b decoding logic;
   providing switchable FC and GbE Start of Frame Delimiter (SFD) and End of Frame Delimiter (EFD) detection logic; providing common Cyclic Redundancy Check (CRC) logic;
   providing common packetizing logic; and
   providing common First In First Out (FIFO) buffering.

58. One or more storage media including a computer program which, when executed by one or more processors in an intelligent network processor (INP), assists in enabling the NP to connect to a Fibre Channel (FC) protocol fabric, a Gigabit Ethernet (GbE) protocol fabric and to a host computer by causing the one or more processors to perform the step of:
   responding to protocol designation messages from the host computer, FC messages from a Combined Media Access Controller (CMAC) module through its corresponding port interface, and GbE messages from a CMAC through its corresponding port interface and selectively configuring each port interface and each CMAC for either FC or GbE operation.

59. The one or more storage media as recited in claim 58, wherein the computer program, when executed by the one or more processors, further causes the one or more processors to perform the step of providing protocol control signals to a Protocol Coordination Stage (PCS) module connected to a plurality of CMAC modules, the plurality of CMAC modules and corresponding port interfaces connected to the CMAC modules in order to select between FC and GbE and to command when the PCS module is to start and stop the coordination of the trunk formed by the plurality of CMAC modules connected to the PCS.

60. The one or more storage media as recited in claim 59, wherein the computer program, when executed by the one or more processors, further causes the one or more processors to perform the step of coordinating the plurality of CMAC modules connected to the PCS to form a FC XAUI trunk for connection to a 10 Gb FC protocol fabric through the plurality of port interfaces corresponding to each CMAC connected to the PCS.

61. The one or more storage media as recited in claim 59, wherein the computer program, when executed by the one or more processors, further causes the one or more processors to perform the step of coordinating the plurality CMAC modules connected to the PCS to form a GbE XAUI trunk for connection to a 10 GbE protocol fabric through the plurality of port interfaces corresponding to each CMAC connected to the PCS.

62. An intelligent network processor (INP) having expanded Media Access Controller (MAC) packet filtering, comprising:
   one or more MACs, each with a fixed number of packet filtering rule registers; and
   a hash engine communicatively coupled to the one or more MACs for receiving a destination MAC address, generating a hash output, and comparing the hash output to a table of hash entries containing valid destination MAC addresses to determine if there is a match;
   wherein the table of hash entries is stored external to the INP and is not limited by the fixed number of packet filtering rule registers; and
   wherein the hash engine includes programmable offsets for identifying the destination MAC address in a packet formatted according to different protocols.

63. A method for providing expanded Media Access Controller (MAC) packet filtering, comprising:
- providing one or more MACs, each with a fixed number of packet filtering rule registers;
- storing a table of hash entries in memory not limited by the fixed number of packet filtering rule registers;
- selectively adjusting programmable offsets in the hash engine to identify a destination MAC address in a packet formatted according to a particular protocol;
- receiving the destination MAC address at a hash engine and generating a hash output;
- comparing the hash output to a table of hash entries containing valid destination MAC addresses to determine if there is a match; and forwarding the packet to a processor for processing if there was a match.

64. An intelligent network processor (INP) for connecting to a first protocol fabric, a second protocol fabric and to a host computer, comprising:
- a plurality of port interfaces for connection to a protocol fabric, and adjustable to be selectively compatible with the first or second protocol;
- a plurality of Combined Media Access Controller (CMAC) modules, with each CMAC connected to a corresponding port interface, and adjustable to be selectively compatible with the first or second protocol; and
- an Application Processor (APEX) module connected to each port interface for selecting between support for the first or second protocol, and connected to each CMAC for selecting between support for the first or second protocol, and enabled to execute firmware for responding to protocol designation messages from the host computer, messages in the first protocol from a CMAC through its corresponding port interface, and messages in a second protocol from a CMAC through its corresponding port interface;
- wherein the APEX module is capable of executing firmware for the reception of messages in the first protocol from a first CMAC through its corresponding first port interface, for the translation of such messages in the first protocol to messages in the second protocol, and for the transmission of the messages in the second protocol through a second CMAC through its corresponding second port interface.

65. The INP as recited in claim 64, wherein the first protocol is FC and the second protocol is GbE.

66. An intelligent network processor (INP) on a single silicon die for connection to a Fibre Channel (FC) protocol fabric and to a Gigabit Ethernet (GbE) protocol fabric and to a host computer, comprising:
- a plurality of port interfaces for connection to a protocol fabric, and adjustable to be selectively compatible with FC or GbE;
- a Bi-directional Crossbar Module (BCM) coupled to receive messages from each of the plurality of port modules, and having crossbar passageways compatible with both FC and GbE messages; and
- an application processor (APEX) module coupled to the BCM for controlling the connections between the port interfaces through the BCM, and for allowing simultaneous crossbar connections of FC and GbE messages through the passageways of the BCM.

67. The INP as recited in claim 66, wherein the APEX is capable of executing firmware for switching of messages by detecting a desired destination interface port from contents of a message from an incoming port, and by activating the BCM to connect the incoming port to the desired destination port.

68. The INP as recited in claim 66, wherein the APEX maintains a routing table with entries mapping desired addresses with corresponding interface ports, and is capable of executing firmware for the routing of messages by detecting a desired address from contents of a message from an incoming port, and by activating the BCM to connect the incoming port to the destination port obtained by lookup of the desired address from the routing table.

69. A method for connecting to a first protocol fabric, a second protocol fabric and to a host computer, comprising:
- providing a plurality of port interfaces for connection to a protocol fabric, the plurality of port interfaces being adjustable to be selectively compatible with the first or second protocol;
- providing a plurality of Combined Media Access Controller (CMAC) modules, each CMAC connected to a corresponding port interface and adjustable to be selectively compatible with the first or second protocol;
- responding to protocol designation messages from the host computer, messages in the first protocol from a CMAC through its corresponding port interface, and messages in a second protocol from a CMAC through its corresponding port interface; and
- receiving messages in the first protocol from a first CMAC through its corresponding first port interface, translating such messages in the first protocol to messages in the second protocol, and transmitting the messages in the second protocol through a second CMAC through its corresponding second port interface.

70. The method as recited in claim 69, wherein the first protocol is FC and the second protocol is GbE.

71. A method for connection to a Fibre Channel (FC) protocol fabric and to a Gigabit Ethernet (GbE) protocol fabric and to a host computer, comprising:
- providing a plurality of port interfaces for connection to a protocol fabric, the plurality of port interfaces being adjustable to be selectively compatible with FC or GbE;
- receiving messages from each of the plurality of port modules through a Bi-directional Crossbar Module (BCM) having crossbar passageways compatible with both FC and GbE messages;
- controlling the connections between the port interfaces through the BCM; and
- allowing simultaneous crossbar connections of FC and GbE messages through the passageways of the BCM.

72. The method as recited in claim 71, further comprising switching messages by detecting a desired destination interface port from contents of a message from an incoming port, and activating the BCM to connect the incoming port to the desired destination port.

73. The method as recited in claim 71, further comprising:
- maintaining a routing table with entries mapping desired addresses with corresponding interface ports;
- routing messages by detecting a desired address from contents of a message from an incoming port; and
- activating the BCM to connect the incoming port to the destination port obtained by lookup of the desired address from the routing table.

74. An intelligent network processor (INP) for connection to a protocol fabric, comprising:
- a plurality of port interfaces for connection to a protocol fabric, and adjustable to be selectively compatible with FC or GbE; a bidirectional crossbar module (BCM) coupled to receive messages from each of the plurality of port modules, and having crossbar passageways compatible with both FC and GbE messages;

a DDR memory interface for connecting to an external DDR memory, for storing and retrieving data messages in queues contained in the DDR memory, and connected to send and receive data messages directly from the BCM; and an application processor module (APEX) coupled to the BCM for controlling the connections between the port interfaces and the DDR memory interface through the BCM, and enabling direct memory access operations between the DDR memory interface and the BCM without data messages passing through the APEX.

75. A method for connecting a plurality of port interfaces to a protocol fabric, comprising:

providing a plurality of port interfaces for connection to a protocol fabric, the plurality of port interfaces being adjustable to be selectively compatible with FC or GbE;

receiving messages from each of the plurality of port interfaces through a bidirectional crossbar module (BCM) having crossbar passageways compatible with both FC and GbE messages;

connecting to an external DDR memory for storing and retrieving data messages in queues contained in DDR memory, and for sending and receiving data messages directly from the BCM; and controlling the connections between the port interfaces and the DDR memory interface through the BCM, and enabling direct memory access operations between the DDR memory interface and the BCM without data messages passing through the APEX.

* * * * *